(12) United States Patent
Uchimura et al.

(10) Patent No.: US 8,208,531 B2
(45) Date of Patent: Jun. 26, 2012

(54) INFORMATION PROCESSING DEVICE, INFORMATION PROCESSING METHOD, PROGRAM STORAGE MEDIUM, PROGRAM, DATA STRUCTURE, AND RECORDING MEDIUM MANUFACTURING METHOD

(75) Inventors: Kouichi Uchimura, Kanagawa (JP); Kazuo Yamamoto, Chiba (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1485 days.

(21) Appl. No.: 11/629,082

(22) PCT Filed: Apr. 6, 2006

(86) PCT No.: PCT/JP2006/307334
§ 371 (c)(1),
(2), (4) Date: Dec. 11, 2006

(87) PCT Pub. No.: WO2006/109673
PCT Pub. Date: Oct. 19, 2006

(65) Prior Publication Data
US 2008/0291206 A1 Nov. 27, 2008

(30) Foreign Application Priority Data

Apr. 11, 2005 (JP) ................................. 2005-113302

(51) Int. Cl.
*H04B 1/66* (2006.01)
*H04N 5/92* (2006.01)

(52) U.S. Cl. ........................................ 375/240; 386/244

(58) Field of Classification Search ........................ None
See application file for complete search history.

(56) References Cited

U.S. PATENT DOCUMENTS 5,509,092 A * 4/1996 Hirayama et al. ............ 382/301

(Continued)

FOREIGN PATENT DOCUMENTS

GB 2 183 428 A 6/1987

(Continued)

OTHER PUBLICATIONS

U.S. Appl. No. 12/905,818, filed Oct. 15, 2010, Kobayashi, et al.
U.S. Appl. No. 10/589,192, filed Aug. 11, 2006, Kobayashi et al.
U.S. Appl. No. 12/858,477, filed Aug. 18, 2010, Kobayashi, et al.
Japanese Office Action issued Sep. 21, 2010, in Patent Application No. 2005-113302.
"White Paper Blu-Ray Disc Format 2.B Audio Visual Application Format Specifications for BD-ROM", Blu-Ray Disc Association, XP 007903517, Mar. 2005, 35 Pages.

(Continued)

*Primary Examiner* — Joseph Ustaris
*Assistant Examiner* — Edemio Navas, Jr.
(74) *Attorney, Agent, or Firm* — Oblon, Spivak, McClelland, Maier & Neustadt, L.L.P.

(57) ABSTRACT

The present invention relates to an information processing device and information processing method, program storage medium, program, data structure, and manufacturing method for storage medium wherein a user can determine subtitles with certainty. That is, an attribute buffer 123 holds at least font style specifying information which specifies a font style to be applied for a character object for a subtitle held in a character object buffer 122, and width specifying information which can specify the width of the outline of the character object corresponding to the font style having an outline. In the case that the font style having an outline is specified in the font style specifying information, a font rasterizer 124 obtains font style data of the font style having an outline, updates the font style data based on the width specifying information, and converts the character object into subtitle data, using at least the updated font style data.

3 Claims, 34 Drawing Sheets

U.S. PATENT DOCUMENTS

| | | | |
|---|---|---|---|
| 6,678,410 B1 * | 1/2004 | Phinney et al. | 382/181 |
| 6,744,921 B1 * | 6/2004 | Uchida et al. | 382/185 |
| 2004/0081434 A1 * | 4/2004 | Jung et al. | 386/95 |
| 2004/0213458 A1 * | 10/2004 | Kanatsu | 382/181 |
| 2006/0156358 A1 | 7/2006 | Adolph et al. | |

FOREIGN PATENT DOCUMENTS

| | | |
|---|---|---|
| JP | 62 216969 | 9/1987 |
| WO | 2004 034398 | 4/2004 |
| WO | 2004 036574 | 4/2004 |
| WO | 2004 049710 | 6/2004 |
| WO | WO 2004/090885 A1 | 10/2004 |

OTHER PUBLICATIONS

Office Action issued Jan. 30, 2012 in European Patent Application No. 06 731 282.7-1247 filed Apr. 6, 2006.

Ola Anderson et al: "Scalable Vector Graphics (SVG) 1.1 Specification: Chapter 11 Painting : Filling, Stroking and Markter", Jan. 14, 2003. XP55017045. Retrieved from the Internet: URL:http://www.w3.org/RT/2003/REC-SVG11-20030114/painting.html [retrieved on Jan. 20, 2012].

* cited by examiner

FIG. 8

| DATA STRUCTURE | NUMBER OF BITS | BIT STRING NOTATION |
|---|---|---|
| TextSubtitleArchive () { | | |
| PlayList_file | X | uimsbf |
| number_of_TextSubtitle | 8 | uimsbf |
| for (i=0; i<number_of_TextSubtitle; i++) { | | |
| text_subtitle_file | Y | uimsbf |
| font_file | Z | uimsbf |
| } | | |
| } | | |

FIG. 9

| DATA STRUCTURE | NUMBER OF BITS | BIT STRING NOTATION |
|---|---|---|
| SubPlayItem () { | | |
|   Ref_to_STC_id | 8 | uimsbf |
|   SubPlayItem_IN_time | 32 | uimsbf |
|   SubPlayItem_OUT_time | 32 | uimsbf |
|   number_of_ClipTextSubtitle | 8 | uimsbf |
|   for (i=0; i<number_of_ClipTextSubtitle; i++) { | | |
|     language_id | 8 | uimsbf |
|     character_code_id | 8 | uimsbf |
|     font_format_id | 8 | uimsbf |
|     font_file_path_length | 16 | uimsbf |
|     font_file_path | X | uimsbf |
|     subtitle_file_path_length | 16 | uimsbf |
|     subtitle_file_path | Y | uimsbf |
|     comment_length | 16 | uimsbf |
|     comment | Z | uimsbf |
|   } | | |
| } | | |

FIG. 11

| DATA STRUCTURE | NUMBER OF BITS | BIT STRING NOTATION |
|---|---|---|
| Text_subtitle_stream() { | | |
|   dialog_style_stream() | | |
|   number_of_dialog_presentation_segments | 16 | uimsbf |
|   for(i=0;i<number_of_dialog_presentation_segments;i++) { | | |
|     dialog_presentation_segment() | | |
|   } | | |
| } | | |

FIG. 12

| DATA STRUCTURE | NUMBER OF BITS | -BIT STRING NOTATION |
|---|---|---|
| segment () { | | |
|   segment_descriptor () | | |
|   segment_data () | | |
| } | | |

FIG. 13

| DATA STRUCTURE | NUMBER OF BITS | BIT STRING NOTATION |
|---|---|---|
| segment_descriptor () { | | |
| segment_type | 8 | bslbf |
| segment_length | 16 | uimsbf |
| } | | |

FIG. 14

| VALUE | SEGMENT TYPE |
|---|---|
| 0x00 – 0x13 | reserved |
| 0x14 – 0x18 | Used for HDMV graphics streams |
| 0x19 – 0x7F | reserved |
| 0x80 | Used for HDMV graphics streams |
| 0x81 | Dialog Style Segment |
| 0x82 | Dialog Presentation Segment |
| 0x83 – 0xFF | reserved |

FIG. 15

| DATA STRUCTURE | NUMBER OF BITS | BIT STRING NOTATION |
|---|---|---|
| dialog_style_segment() { | | |
| segment_descriptor() | | |
| dialog_style_set() | | |
| } | | |

FIG. 16

| DATA STRUCTURE | NUMBER OF BITS | BIT STRING NOTATION |
|---|---|---|
| dialog_style_set() { | | |
|     player_style_flag | 1 | bslbf |
|     reserved | 15 | bslbf |
|     number_of_region_styles | 8 | uimsbf |
|     number_of_user_styles | 8 | uimsbf |
|     for(i=0; i<number_of_region_styles; i++) { | | |
|         region_style() { | | |
|             region_style_id | 8 | bslbf |
|             region_info() { | | |
|                 region_horizontal_position | 16 | uimsbf |
|                 region_vertical_position | 16 | uimsbf |
|                 region_width | 16 | uimsbf |
|                 region_height | 16 | uimsbf |
|                 region_bg_palette_entry_id_ref | 8 | uimsbf |
|                 reserved | 8 | bslbf |
|             } | | |
|             text_box_horizontal_position | 16 | uimsbf |
|             text_box_vertical_position | 16 | uimsbf |
|             text_box_width | 16 | uimsbf |
|             text_box_height | 16 | uimsbf |
|             text_flow | 8 | bslbf |
|             text_horizontal_alignment | 8 | bslbf |
|             text_vertical_alignment | 8 | bslbf |
|             line_space | 8 | uimsbf |
|             font_id_ref | 8 | uimsbf |
|             font_style | 8 | bslbf |
|             font_size | 8 | uimsbf |
|             font_palette_entry_id_ref | 8 | uimsbf |
|             outline_palette_entry_id_ref | 8 | uimsbf |
|             outline_size | 8 | uimsbf |
|     } | | |

FIG. 17

| | | |
|---|---|---|
| user_changeable_style_set() { | | |
| for (j=0; j<number_of_user_styles; j++) { | | |
| User_control_style() { | | |
| user_style_id | 8 | bslbf |
| region_horizontal_position_direction | 1 | bslbf |
| region_horizontal_position_delta | 15 | uimsbf |
| region_vertical_position_direction | 1 | bslbf |
| region_vertical_position_delta | 15 | uimsbf |
| font_size_inc_dec | 1 | bslbf |
| font_size_delta | 7 | uimsbf |
| text_box_horizontal_position_direction | 1 | bslbf |
| text_box_horizontal_position_delta | 15 | uimsbf |
| text_box_vertical_position_direction | 1 | bslbf |
| text_box_vertical_position_delta | 15 | uimsbf |
| text_box_width_inc_dec | 1 | bslbf |
| text_box_width_delta | 15 | uimsbf |
| text_box_height_inc_dec | 1 | bslbf |
| text_box_height_delta | 15 | uimsbf |
| line_space_inc_dec | 1 | bslbf |
| line_space_delta | 7 | uimsbf |
| } | | |
| } | | |
| } | | |
| } | | |
| palette() | | |
| } | | |

FIG. 18

| VALUE | DEFINITION |
|---|---|
| 0$_b$ | Author prohibits a player to use its own style. |
| 1$_b$ | Author permits a player to use its own style. |

FIG. 19

| VALUE | DEFINITION |
|---|---|
| 0 | reserved |
| 1 | Left-to-Right character progression<br>Top-to-Bottom line progression |
| 2 | Right-to-Left character progression<br>Top-to-Bottom line progression |
| 3 | Top-to-Bottom character progression<br>Right-to-Left line progression |
| other values | reserved |

FIG. 20

| VALUE | DEFINITION |
|---|---|
| 0 | reserved |
| 1 | Left |
| 2 | Center |
| 3 | Right |
| other values | reserved |

FIG. 21

| VALUE | DEFINITION |
|---|---|
| 0 | reserved |
| 1 | Top |
| 2 | Middle |
| 3 | Bottom |
| other values | reserved |

FIG. 22

| VALUE | DEFINITION |
|---|---|
| 0x00 | Normal |
| 0x01 | Bold |
| 0x02 | Italic |
| 0x03 | Bold and Italic |
| 0x04 | Outline-bordered |
| 0x05 | Bold and Outline-bordered |
| 0x06 | Italic and Outline-bordered |
| 0x07 | Bold, Italic and Outline-bordered |
| other values | Reserved |

FIG. 23

| Data_type | Meanings | Data_length | inline_style_values() or text_string() |
|---|---|---|---|
| 0x00 | reserved | | |
| 0x01 | Text string start | Length of the text string | A sequence of character codes, coded according to character_code defined in the StreamCodingInfo of the associated Clip Information file. |
| 0x02 | Change a font set | 1 | A font ID value defined in the associated Clip Information File. |
| 0x03 | Change a font style | 3 | A font_style value according to Table 9-57 Outline_palette_id_ref Outline_size |
| 0x04 | Change a font size | 1 | A font_size value from 8 to 72 |
| 0x05 | Change a font color | 1 | An index value from the palette |
| other values | reserved | | |
| 0x0A | Line break[1] | 0 | |
| 0x0B | End of inline style[2] | 0 | |
| other values | reserved | | |

FIG. 28
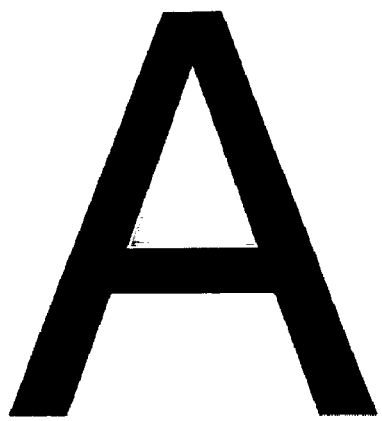
171
FIG. 29
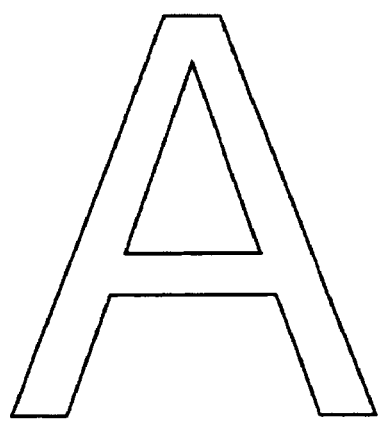
181

INFORMATION PROCESSING DEVICE, INFORMATION PROCESSING METHOD, PROGRAM STORAGE MEDIUM, PROGRAM, DATA STRUCTURE, AND RECORDING MEDIUM MANUFACTURING METHOD

TECHNICAL FIELD

The present invention relates to an information processing device and information processing method, program storage medium, program, data structure, and manufacturing method for storage medium, and particularly relates to an information processing device and information processing method, program storage medium, program, data structure, and manufacturing method for storage medium wherein a user can determine subtitles with certainty.

BACKGROUND ART

One of the specifications for playback of a DVD (Digital Versatile Disc) is that of a DVD video format. With the DVD video format, content data such as video or audio is multiplexed along with various types of sub-picture data such as subtitles, and are recorded on the disk as a program stream. Also, navigation data for playing back such stream interactively is stored on the disk. Such technology is disclosed in for example Patent Document 1, Patent Document 2, and so forth.

Here, interactive playback refers to playback such as playback from a desired position or in a desired order, as well as playback wherein a user uses various types of functionality of a DVD, such as a multi-angle function which can play back a moving image which is image-captured from various angles, a multi-language function which can play back in a desired language from multiple languages, a parental control function which does not perform playback of certain scenes such as violence scenes, and the like.

A program stream can multiplex multiple audio streams and multiple subtitle data streams. Thus, for example, data for subtitles in multiple different languages can be recorded onto one disk as to one video content such as a movie, and the user can select the audio of the desired language or subtitles before starting playback or during playback of the video.

[Patent Document 1] Japanese Unexamined Patent Application Publication No. 2003-140662

[Patent Document 2] Japanese Unexamined Patent Application Publication No. 2002-311967

DISCLOSURE OF THE INVENTION

Problems to be Solved by the Invention

However, although the subtitles and video are simultaneously played back, that is to say, although the video for each frame played back consecutively and the subtitles corresponding thereto are included, of these frames, there have been problems with a frame wherein for example the color of the subtitle and the color of the video is the same or similar, which from the perspective of the user, the subtitles and the video have been integrated, and the subtitles cannot be differentiated.

The present invention has been made with consideration for such a situation, and provides a configuration wherein the user can differentiate the subtitles with certainty.

Means for Solving the Problems

The information processing device according to the present invention is an information processing device for generating subtitle data to display subtitles corresponding to a predetermined AV stream, comprising character object holding means for holding a character object in order to display the subtitles; attribute data holding means for holding attribute data which includes at least font style specifying information which can specify at least a font style with an outline as a font style to be applied for the character objects, and width specifying information which can specify the width of the outline of the character object corresponding to the font style having an outline in the case that the font style having an outline is specified in the font style specifying information; and converting means for obtaining font style data of the font style having an outline in the case whereby the font style having an outline is specified in the font style specifying information held by the attribute data holding means, updating the font style data based on the width specifying information held by the attribute data holding means, and converting the character object held by the character object holding means into subtitle data, using at least the updated font style data.

The converting means may be configured to further include: obtaining means for obtaining a first font style data of the font style having an outline in the case that the font style having an outline is specified in the font style specifying information; width changing means for performing processing to expand or contract the width of the character object outline corresponding to the first font style data obtained with the obtaining means, based on the width specifying information, at the same ratio for the inner side direction facing the outline portion of the character object and the opposite outer side direction thereof, and outputting a second font style data of a font style having an outline wherein the width thereof has been expanded or contracted in the inner side direction and the outer side direction; and synthesizing means for performing processing to synthesize the character object data corresponding to the first font style data obtained with the obtaining means onto the character object corresponding to the second font style data output from the width changing means, and outputting the subtitle data formed by character object data of a font style having an outline wherein the width thereof has been expanded or contracted in only the outer side direction, which is obtained as a result of the processing.

The attribute information held by the attribute data holding means may further include: color specifying information which can specify the color of the outline for the character object corresponding to the font style having an outline, in the case that the font style having an outline is specified in the font style specifying information, wherein; the converting means updates the font style data based on the color specifying information further in addition to the width specifying information held by the attribute data holding means, and converts the character object held by the character object holding means into the subtitle data, using at least the updated font style data.

The information processing method according to the present invention is an information processing method of an information processing device for generating subtitle data to display subtitles corresponding to a predetermined AV stream, and may include: a character object holding control step for controlling the holding of a character object in order to display the subtitles; an attribute data holding control step for controlling the holding of attribute data which includes at least font style specifying information which can specify at least a font style having an outline as a font style to be applied for the character objects, and width specifying information which can specify the width of the outline of the character object corresponding to the font style having an outline in the case that the font style having an outline is specified in the font style specifying information; and a converting step for obtaining font style data of the font style having an outline in the case whereby the font style having an outline is specified in the font style specifying information held by the control processing of the attribute data holding control step, updating the font style data based on the width specifying information held by the processing of the attribute data holding controlling step, and converting the character object held by the character object holding means into subtitle data, using at least the updated font style data.

The program storage medium and program of the present invention are each the program storage medium and program corresponding to the information processing method of the present invention as described above.

With the information processing device and method, program storage medium, and program according to the present invention, subtitle data is generated for displaying subtitles corresponding to the predetermined AV stream. Specifically, the subtitle data is generated as follows. In other words, a character object for displaying subtitles is held, and also attribute data is held which includes at least font style specifying information which can specify at least a font style having an outline as a font style to be applied for the character objects, and width specifying information which can specify the width of the outline of the character object corresponding to the font style having an outline in the case that the font style having an outline is specified in the font style specifying information. Thus, font style data of a font style having the outline in the case whereby the font style having an outline is specified in the held font style specifying information is obtained, the font style data based on the held width specifying information is updated, and the held character object is converted into subtitle data, using at least the updated font style data.

The data structure according to the present invention is a data structure of information necessary for generating subtitle data to display subtitles corresponding to a predetermined AV stream, and may include: a character object for displaying the subtitles; and attribute data which includes at least font style specifying information which can specify at least the font style having an outline as a font style to be applied for the character objects, and width specifying information which can specify the width of the outline of the character object corresponding to the font style having an outline in the case that the font style having an outline is specified in the font style specifying information.

The data structure is included in a predetermined stream, and a clip information file which manages the predetermined stream can include specifying information for specifying the file corresponding to the character object.

The data structure is stored in a file separate from the file wherein the AV stream is stored, and wherein the AV stream is specified by a PlayItem held in a PlayList file which is playback managing information, and wherein the data structure is specified by a SubPlayItem held in the PlayList file.

The recording medium according to the present invention is a data structure of information necessary for generating subtitle data to display subtitles corresponding to a predetermined AV stream, and may include: a character object for displaying the subtitles, and attribute data which includes at least font style specifying information which can specify at least a font style having an outline as a font style to be applied for the character objects, and width specifying information which can specify the width of the outline of the character object corresponding to the font style having an outline in the case that the font style having an outline is specified in the font style specifying information.

A manufacturing method of the recording medium according to the present invention may include the steps of: generating data which has a certain data structure, such data structure being of information necessary for generating subtitle data for the purpose of a playback device playing back subtitles corresponding to a predetermined AV stream, and further including a character object for displaying the subtitles; and attribute data which includes at least font style specifying information which can specify at least a font style having an outline as a font style to be applied for the character objects, and width specifying information which can specify the width of the outline of the character object corresponding to the font style having an outline in the case that the font style having an outline is specified in the font style specifying information; and recording the generated data onto the recording medium to be the playback object of the playback device.

With the data having a data structure according to the present invention, data recorded onto a recording medium according to the present invention, and data recorded onto a recording medium manufactured with the manufacturing method of the recording medium according to the present invention, subtitle data for displaying subtitles corresponding to a predetermined AV stream is generated. In other words, subtitle data is generated, using a character object for displaying the subtitles, and attribute data which includes at least font style specifying information which can specify at least the font style having an outline as a font style to be applied for the character objects, and width specifying information which can specify the width of the outline of the character object corresponding to the font style having an outline in the case that a font style having an outline is specified in the font style specifying information.

Advantages

According to the present invention, when a predetermined AV stream is being played back, subtitles corresponding to the AV stream can be displayed. In particular, the user can differentiate the subtitles with certainty.

BRIEF DESCRIPTION OF THE DRAWINGS

FIG. 8 is a diagram for describing data to be additionally distributed later;

FIG. 9 is a diagram illustrating a syntax of a SubPlayItem;

FIG. 11 is a diagram illustrating a syntax of the text subtitle file in FIG. 10;

FIG. 12 is a diagram illustrating the syntax of each segment configuring the text subtitles in FIG. 10;

FIG. 13 is a diagram illustrating the segment_descriptor syntax of the segment configuration elements in FIG. 12;

FIG. 14 is a diagram describing a value which can be specified with the segment_type in FIG. 13;

FIG. 15 is a diagram illustrating the dialog_style_segment syntax of each segment configuring the text subtitles in FIG. 10;

FIG. 16 is a diagram describing the dialog_style_set syntax of the dialog_style_segment configuration elements in FIG. 15;

FIG. 17 is a diagram describing the dialog_style_set syntax of the dialog_style_segment configuration elements in FIG. 15;

FIG. 18 is a diagram describing a value which can be specified with the player_style_flag in FIG. 16;

FIG. 19 is a diagram describing a value which can be specified with the text_flow in FIG. 16;

FIG. 20 is a diagram describing a value which can be specified with the text_horizontal_alignment in FIG. 16;

FIG. 21 is a diagram describing a value which can be specified with the text_vertical_alignment in FIG. 16;

FIG. 22 is a diagram describing a value which can be specified with the font_style in FIG. 16;

FIG. 23 is a diagram illustrating an example of a table as to a Table 9-59 (Data_type definition) of a conventional Blu-Ray Disc Read-Only Format Version 0.89r3, the portions necessary for applying the present invention of which has been updated;

FIG. 28 is a diagram illustrating an example of character object data of a normal font style;

FIG. 29 is a diagram illustrating an example of character object data of an outline font style;

Figure 1:
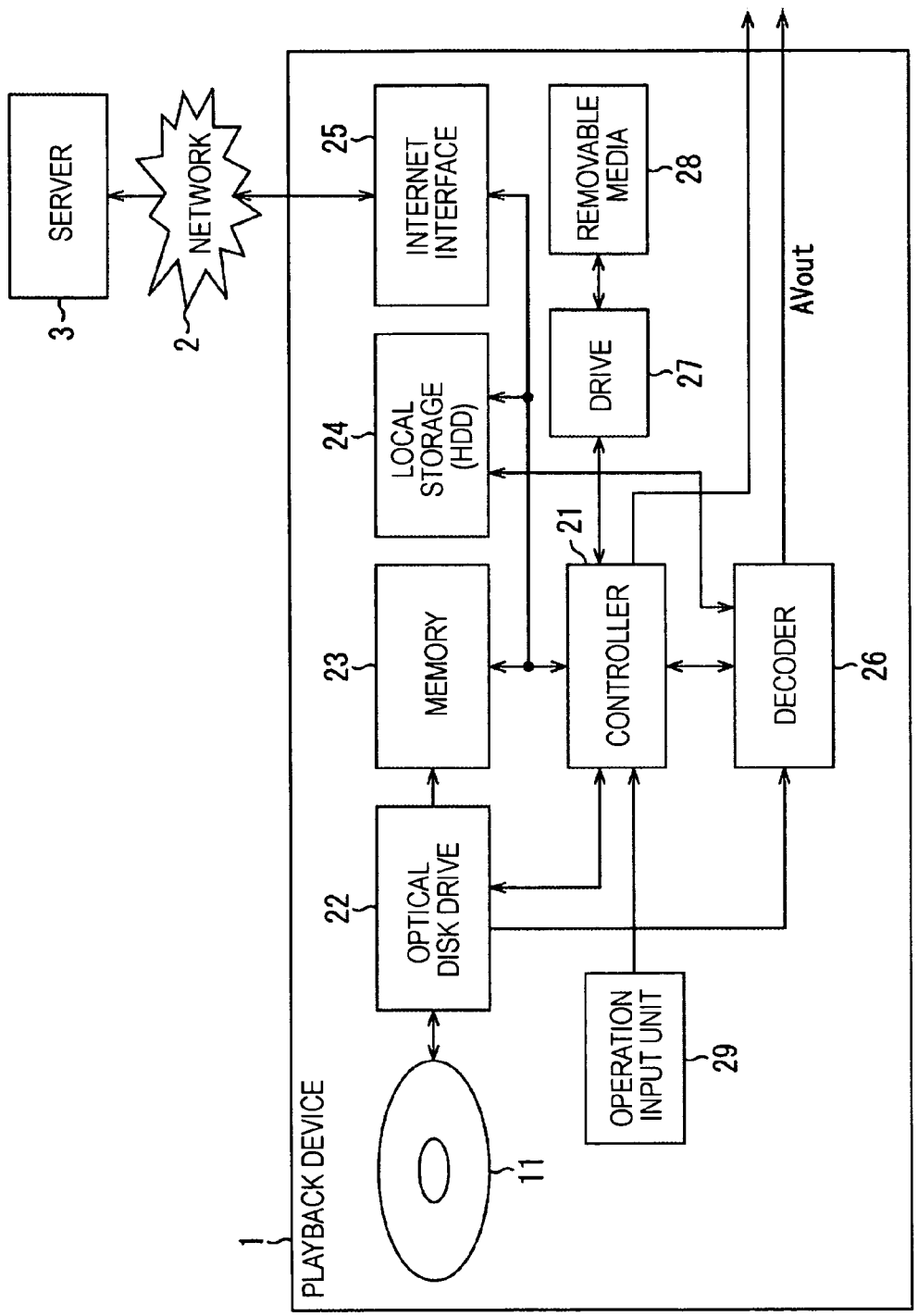
FIG. 1 is a block diagram illustrating the configuration of a playback device using an application of the present invention.

REFERENCE NUMERALS 1 playback device
11 optical device
21 controller
22 optical disk drive
23 memory
24 local storage
26 decoder
31 menu screen display control unit
32 operation input obtaining unit
33 data acquiring unit
34 local storage directory managing unit
35 optical disk directory managing unit
66 file system merging processing unit
37 playback control unit
81 control unit
86 audio decoder
87 MPEG video decoder
92 text subtitle processing unit
93 subtitle graphics plane processing unit
94 synthesizing processing unit
121 text data buffer
122 character object buffer
123 attribute data buffer
124 font rasterizer
125 bookmark buffer
151 character object obtaining unit
152 bookmark detecting unit
153 rasterizing unit
154 bookmark storage control unit
155 font style detecting unit
156 normal font style obtaining unit
157 outline style process unit
161 outline style obtaining unit
162 color changing unit
163 width changing unit
164 synthesizing unit

BEST MODE FOR CARRYING OUT THE INVENTION

The embodiments of the present invention will be described below with reference to the attached drawings.

FIG. 1 is a block diagram illustrating a configuration of a playback device 1 as an information processing device using an application of the present invention.

A controller 21 executes a previously prepared control program, or controls an optical disc drive 22 to read out a navigation program (to be described later) recorded on an optical disc 11 and expands to memory 23 and executes this, thereby controlling the operation of the entire playback device 1. For example, the controller 21 can display a predetermined menu screen on an external display device when an optical disc 11 is mounted thereupon.

The optical disk drive 22 reads out data from the optical disk 11 according to the control by the controller 21, and outputs the read out data to the controller 21, memory 23, or a decoder 26. In the event that the information read out from the optical disk 11 is a navigation program or a PlayList or the like, the information read out from the optical disk drive 22 is output to the controller 21 or the memory 23. In the event that the information read out from the optical disk 11 is an AV stream or text data, the information read out from the optical disk drive 22 is output to the decoder 26.

Figure 2:
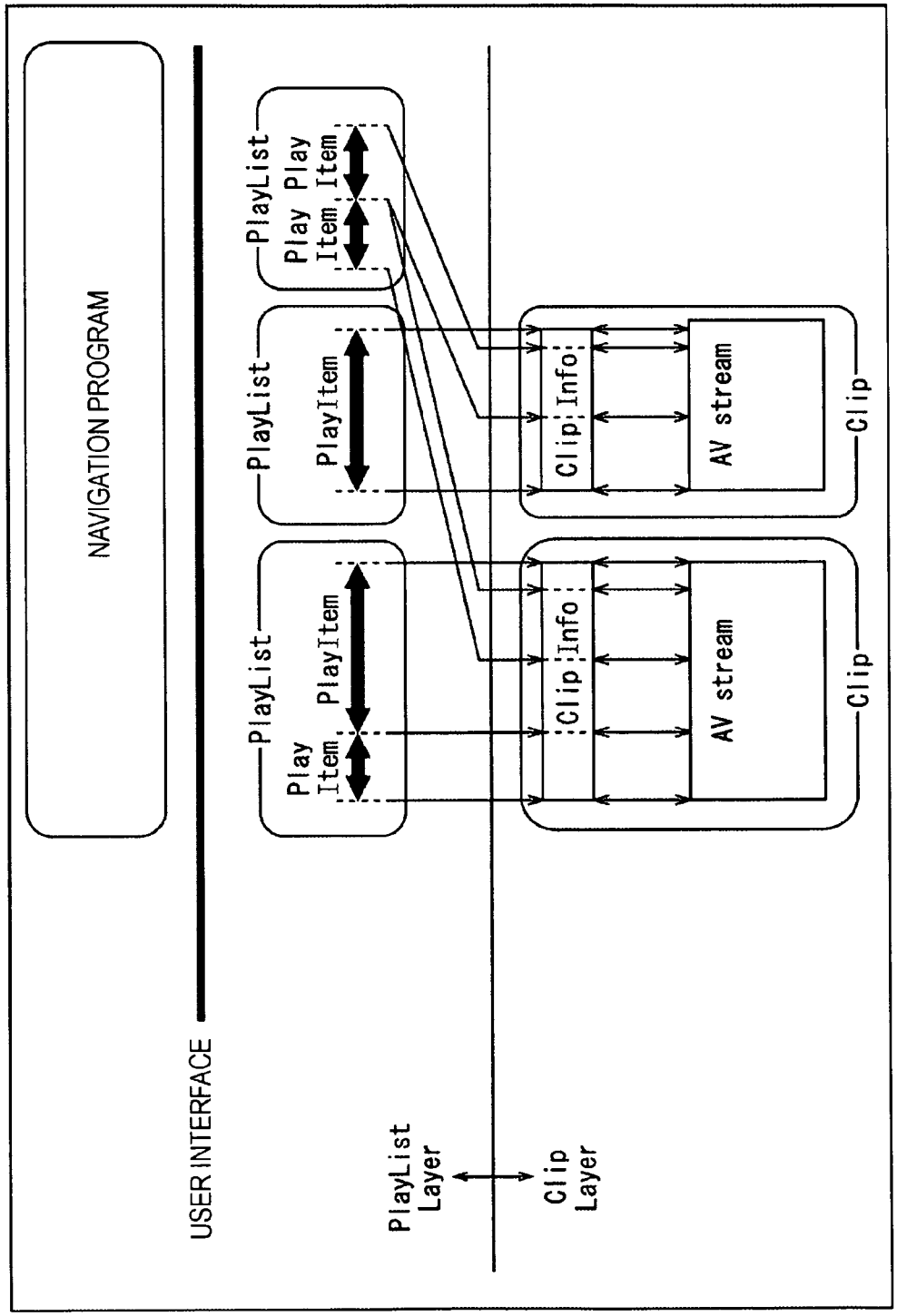
FIG. 2 is a diagram illustrating an example of an application format on a recording medium to be mounted on the playback device using an application of the present invention.

FIG. 2 is a diagram illustrating an example of an application format or the recording medium. Here, recording medium includes an optical disk 11 mounted on the playback device 1 applying the present invention, as well as, for example, a magnetic disk or semiconductor memory.

The application format has two layers of PlayList and Clip, for the purpose of managing the AV (Audio Visual) stream. Here, a pair of one AV stream or text data and a Clip Information which is information attached thereto is considered to be one object, and these together are called a Clip. Hereafter, a data file of an AV stream will be called an AV stream file. Also, a data file of Clip Information will be called a Clip Information file.

Generally, files used in a computer or the like are handled as byte strings, but the content of the AV stream file is expanded along the time axis, and the access point of the Clip is primarily specified by the PlayList with a time stamp.

The Clip Information file is used for finding address information, with a time stamp, for decoding to be started of an AV stream file, when an access point of a Clip is identified by the PlayList with a time stamp.

The PlayList is a collection of information showing the playback segments of an AV stream. Information showing one playback segment of an AV stream is called a PlayItem, and a PlayItem is represented in a pair of an IN point of the playback segment on the time axis (playback starting point) and an OUT point (playback ending point). Accordingly, the PlayList is configured with one or multiple PlayItems, as shown in FIG. 2.

In FIG. 2, the first PlayList illustrated on the far left side is configured of two PlayItems, and the front half portion and the latter half portion of the AV stream included in the first Clip shown on the left side of the diagram are each referenced by the two PlayItems. Also, the second PlayList illustrated the second from the left is configured of one PlayItem, and the entire AV stream included in the second Clip shown on the right side of the diagram is referenced by the PlayItem. Further, the third PlayList illustrated the third from the left is configured of two PlayItems, and the predetermined portion of the AV stream included in the first Clip shown on the left side of the diagram and the predetermined portion of the AV stream included in the second Clip, shown on the right side of the diagram, are each referenced by the two PlayItems.

A navigation program is program for the controller 21 to execute a function for controlling the order of PlayList playback or interactive playback of the PlayLists. Also, the navigation program has functions for displaying a menu screen for the user to specify execution of various types of playback, and so forth. This navigation program is written in a programming language such as Java (registered trademark) or the like for example, and is recorded on a recording medium such as an optical disk 11 or the like. For example, if the navigation program is executed by the controller 21 to specify the first PlayItem included in the first PlayList shown on the far left side of FIG. 2 as information showing the playback position at that time, the front half of the AV stream included in the first Clip shown on the left side, which is referenced by the PlayItem, is played back.

Figure 3:
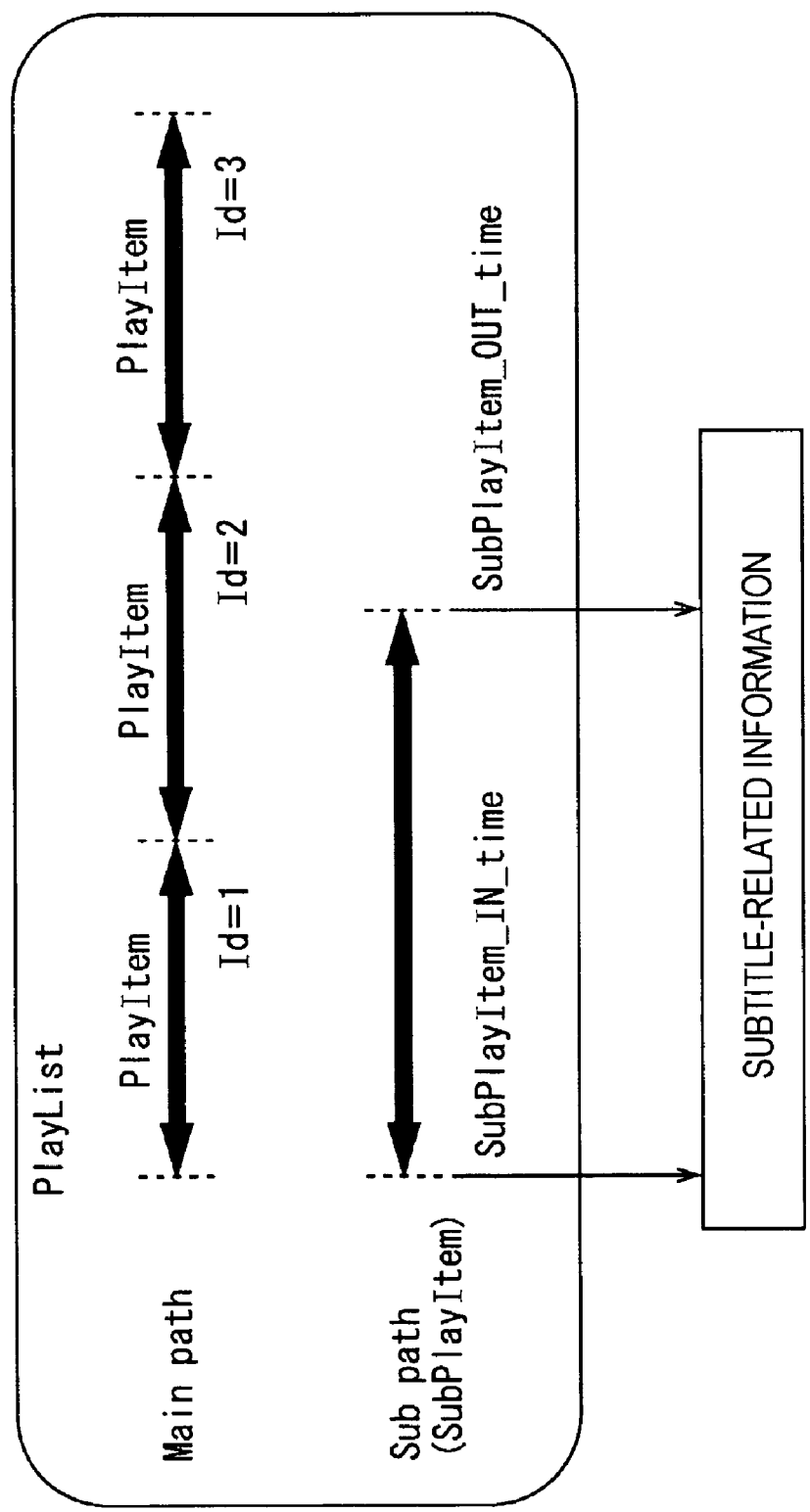
FIG. 3 is a diagram illustrating another example of an application format on a recording medium to be mounted on the playback device using an application of the present invention.

Also, the PlayList described using FIG. 2 can also be configured to include information for a Sub path specified using a Sub Play Item such as that shown in FIG. 3, along with a Main Path specified by the PlayItem. To define the SubPlayItem for example, an independent data stream not multiplexed on a Clip specified by the PlayItem (for example, an MPEG2 transport stream) can be synchronized with the AV stream playback and thus played back.

For example, by corresponding the Clip AV stream of the Main Path specified by the PlayItem with preparing the SubPlayItem specifying the subtitle-related information configured with a text subtitle file and a font file necessary for rendering, and the playback segment of the subtitle-related information, the subtitles corresponding to the data written in the text subtitle file can be displayed on a display device with a display font based on the font style data written in the font file, simultaneous the Clip AV stream being played back. In other words, by specifying a file with the SubPlayItem which is a file separate from the Clip AV stream file of the Main Path including moving image data or audio data, text data with a relatively small capacity can be preloaded on the buffer at the time of the playback starting (at time of disk insertion), for example. Accordingly, even if the streaming files that can be read in at one time are limited to two, for example, to ensure continuous playback of the disk, one streaming file does not need to be assigned to a subtitle requiring playback synchronous with moving image data and the like. Therefore, playback can be continuous, even if a first file stores moving image data and first audio data, a second file stores second audio data, and a third file stores the subtitles, for example, whereby the stream is stored in three files. Thus, as is clear by the above, with a preloaded configuration, continuity can be secured, and playback can be made with a higher degree of freedom.

The subtitle-related information configured by the text subtitle file and the font file required for rendering, and the SubPlayItem can be recorded in advance on the optical disk 11, or can be downloaded from a server 3 via a network 2, or alternatively can be obtained by using a removable media (for example, a removable media 28 to be described later).

The description will now return again to FIG. 1.

The memory 23 has recorded data and so forth necessary for when the controller 21 executes various processing, as appropriate. The local storage 24 is configured with an HDD (Hard Disk Drive) or the like, for example.

An Internet interface 25 is connected to the network 2 with a wire or wirelessly, performs communication with the server 3 via the network 2 according to the control from the controller 21, and supplies the data downloaded from the server 3 to the local storage 24. The data updating the data described using FIG. 2, which is recorded on the optical disk 11 mounted on the playback device 1 at that time, is downloaded as content from the server 3, for example. The local storage 24 can record the content downloaded from the server 3 via the network 2.

The decoder 26 decodes the AV stream supplied from the optical disk drive 22 or the local storage 24 or the text data, and outputs the obtained video signal and audio signal to an external display device. Content recorded on the optical disk 11 for example is output (display of moving images, output of audio) to the display device based on the signals decoded by the decoder 26.

The operation input unit 29 is configured with an input device such as a button, key, touch panel, jog dial, mouse and so forth, and a receiving unit for receiving signals such as infrared rays sent from a predetermined remote commander, obtains operation input from a user, and supplies this to the controller 21.

Also, the controller 21 is connected to a drive 27 as needed, whereupon such drive 27 is mounted a removable media 28 such as, for example, a magnetic disk (including a flexible disk), an optical disk (including CD-ROM (Compact Disk-Read Only Memory) or a DVD), an optical magnetic disk (including an MD (registered trademark) (Mini-Disk)), or semiconductor memory.

Next, a method for playing back the data recorded on the optical disk 11 mounted on the playback device 1 or the data recorded on the local storage 24 will be described.

The playback device 1 has a local storage 24 such as an HDD (Hard Disk Drive) provided internally. The playback device 1 is connected with wires or wirelessly to the network 2, and can record the content downloaded from the server 3 via the network 2 to the local storage 24. The data updating the content such as movies recorded on the optical disk 11 mounted on the playback device 1 at that time can be downloaded from the server 3, for example.

The controller 21 associates the content recorded on the optical disk 11 and the content recorded on the local storage 24 and executes content playback processing, when playback of the contents recorded on the optical disc 11 is instructed from the operation input unit 29 while the downloaded content is in a state of being recorded in the local storage 24.

Figure 4:
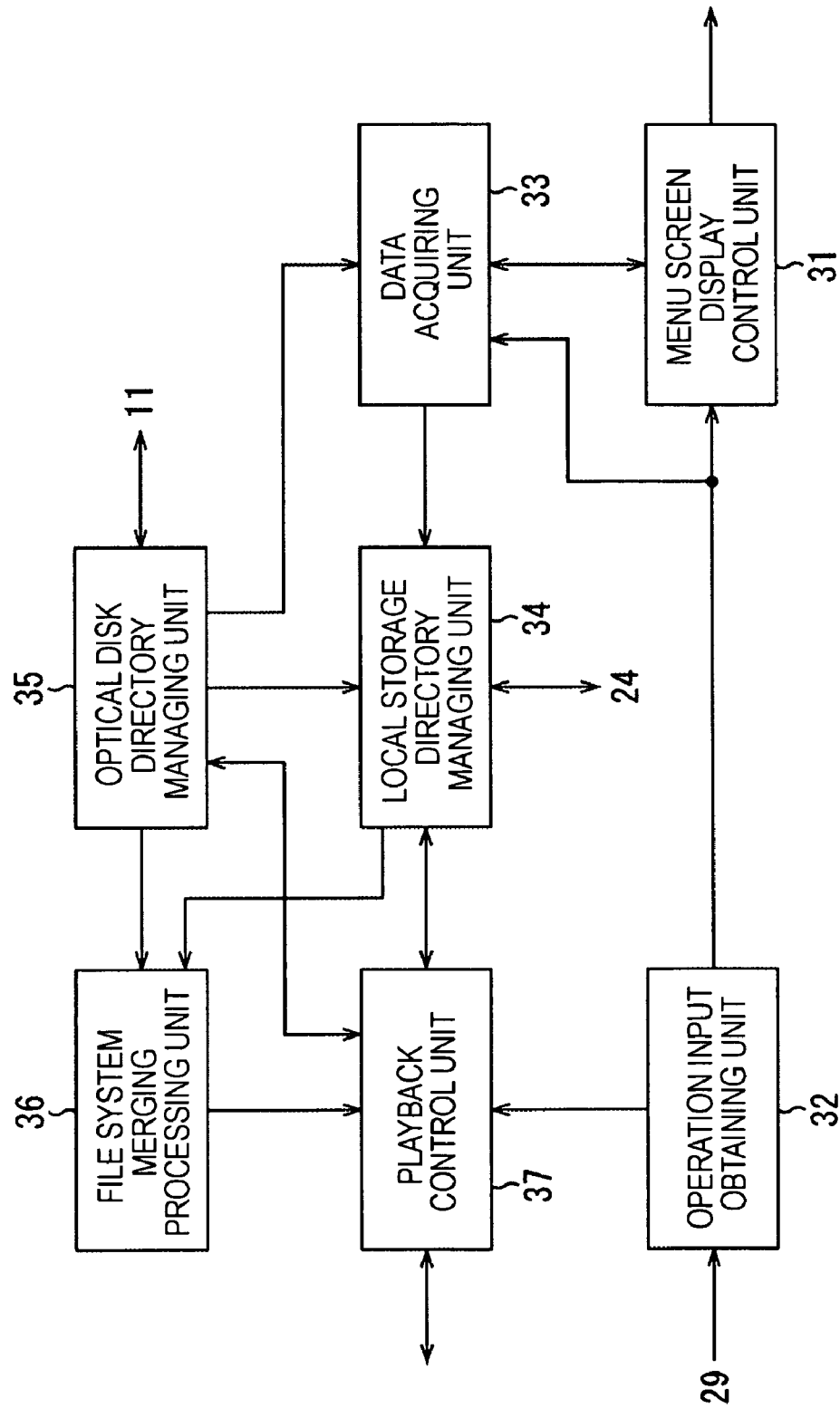
FIG. 4 is a functional block diagram for describing the function of the controller in FIG. 1.

FIG. 4 is a block diagram illustrating a function configuration example of the controller 21 in FIG. 1.

Each configuration in FIG. 4 is realized by a previously prepared control program being executed by the controller 21, or a navigation program recorded on an optical disk 11 being executed by the controller 21.

A menu screen display control unit 31 displays a menu screen including a button to be operated by a user when selecting audio content or subtitle language or image angle recorded on the optical disk 11, or a button to be operated by a user when selecting an update file to be downloaded, on an external display device.

An operating input obtaining unit 32 obtains signals showing operation input by the user which is input from the operation input unit 29, and the signal showing operation input from the user is output in positions corresponding to the menu screen display control unit 31, data acquiring unit 33, or playback control unit 37.

The data acquiring unit 33 controls the communication performed with the Internet interface 25 in FIG. 1 or the sending/receiving of information with the removable media 28 by the drive 27. For example, the data acquiring unit 33 downloads and obtains an update file specified by the user from the server 3, and outputs the obtained file to a local storage directory managing unit 34.

The local storage directory managing unit 34 manages a directory for the local storage 24, and controls writing in data as to the local storage 24 and readout of data from the local storage 24. For example, a PlayList read out from the local storage 24 by the control of the local storage directory managing unit 34 is output to the memory 23, and the audio data or moving image data from the AV stream or text data from a text subtitle file read out from the local storage 24 is output to the decode 26. Also, the local storage directory managing unit 34 outputs information relating to a file system in the local storage 24 to a file system merging processing unit 36 when the file system of the optical disk 11 and the file system of the local storage 24 is merged by the file system merging processing unit 36.

An optical directory managing unit 35 manages a directory for the optical disk 11 and controls the readout of data from the optical disk 11. A Studio_id and a Content_id where are identifying information are set in the optical disk 11, and the Studio_id and Content_id read out from the optical disk 11 by the control of the optical disk directory managing unit 35 are output to the data acquiring unit 33 and the local storage directory managing unit 34. Also, the PlayList read out from the optical disk 11 by the control of the optical disk directory managing unit 35 is output to the memory 23, and the audio data and moving image data of the AV stream and the text data of the text subtitle file read out from the optical disk 11 are output to the decoder 26. Also, the optical disk directory managing unit 35 outputs the information relating to the file system of the optical disk 11 to the file system merging processing unit 36, when the file system of the optical disk 11 and the file system of the local storage 24 are merged by the file system merging processing unit 36 as described later.

The file system merging processing unit 36 merges the file system of the optical disk 11 supplied from the optical disk directory managing unit 35 and the file system of the local storage 24 supplied from the local storage directory managing unit 34 to generate one virtual file system. The file system merging processing unit 36 outputs the virtual file system generated by the merging to the playback control unit 37. Hereafter, the one file system generated by merging with the file system merging processing unit 36 according to the first embodiment will be called the first virtual file system, as appropriate.

The playback control unit 37 executes a navigation program specified by the first virtual file system supplied from the file system merging processing unit 36 to control content playback. Specifically, the playback control unit 37 is supplied to the memory 23, and referencing the recorded PlayList and controlling the local storage directory managing unit 34 or the optical disk directory managing unit 35, the audio data and moving image data in the AV stream recorded on the optical disk 11 or local storage 24 and text data in the text subtitle file is read out as needed, and controlling the decoder 26 in FIG. 1, the audio data and moving image data in the AV stream recorded on the optical disk 11 or local storage 24 and text data in the text subtitle file as needed are decoded (played back).

Here the merging of the file system of the optical disk and the file system recorded on the local storage 24 by downloading from the server 3 and so forth by the file system merging processing unit 36 will be described. For example this merging is performed when playback of the content recorded on the optical disk 11 is instructed.

Figure 5:
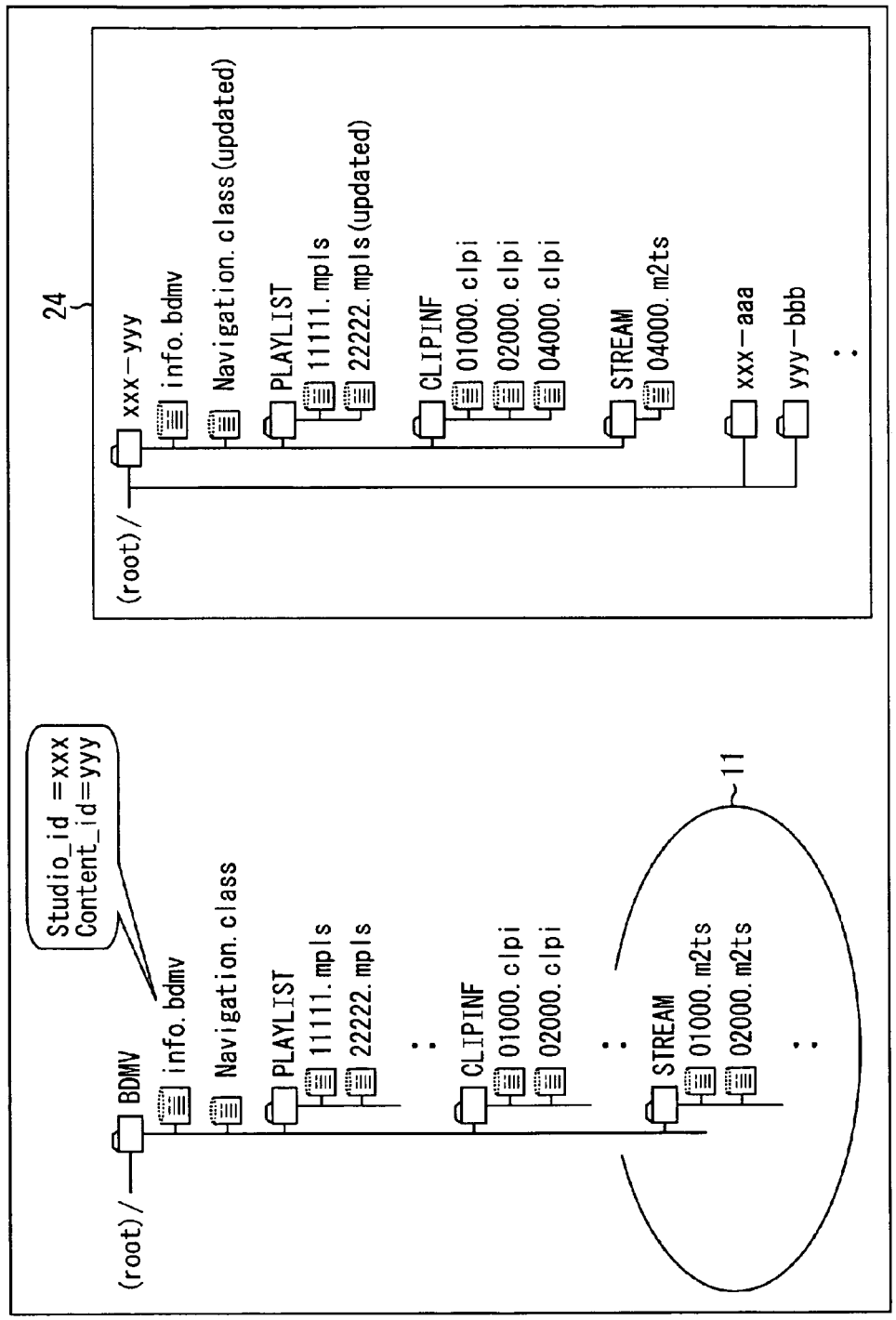
FIG. 5 is a diagram illustrating an example of an optical disk file system and a local storage file system.

FIG. 5 is a diagram showing an example of a file system of the optical disk 11 (left side) and a file system of the local storage 24 (right side). As shown in the diagram, each file system has a directory configuration.

A folder which is set with the name "BDMV" is prepared under "root" of the optical disk 11, and a file which is set with the name "info.bdmv" and a file which is set with the name "Navigation.class" are stored in this folder. Hereafter, these files will be called the info.bdmv file and the Navigation.class file, respectively, as appropriate. Other files and folders also similarly are called by the form with "file" added to "file name" and "folder" added to "folder name".

A Studio_id which is identifying information of the creator of the optical disk 11 and a Content_id which is identifying information of the content are written in the info.bdmv file.

In other words, content recorded onto the optical disk 11 is identified with the Studio_id and Content_id, out of all the contents flowing through. With the example in FIG. 5, the Studio_id is "xxx" and the Content_id is "yyy". Note that Studio_id and Content_id can also be used for identifying an update file to be downloaded.

The Navigation.class file is a navigation program written with a predetermined program language.

A folder which is set with the name "PLAYLIST" (PLAYLIST folder), a folder which is set with the name "CLIPINF" (CLIPINF folder), and a folder which is set with the name "STREAM" (STREAM folder) are stored in the BDMV folder.

In FIG. 5, a file which is set with the name "11111.mpls" and a file which is set with the name "22222.mpls" are stored in the PLAYLIST folder. These files are the PlayList whereby the playback segment of the AV stream file and so forth are shown with a time stamp.

A file which is set with the name "01000.clpi" and a file which is set with the name "02000.clpi" are stored in the CLIPINF folder. These files are the Clip Information whereby the address information of the AV stream file or the subtitle-related information is correlated with the time stamp.

A file which is set with the name "01000.m2ts" and a file which is set with the name "02000.m2ts" are stored in the STREAM folder. These files are the AV stream or the subtitled related information or the like.

On the other hand, a folder which is set with the name "xxx-yyy" is stored under "root" in the local storage 24. The folder name "xxx-yyy" indicates that the data stored therein is data corresponding to the content identified by the Studio_id "xxx" and Content_id "yyy", which is stored on the optical disk 11. The xxx-yyy folder is created when the optical disk 11 having the Studio_id "xxx" and Content_id "yyy" is mounted on the playback device 1 and the update file (each file stored in the xxx-yyy folder) is downloaded.

An info.bdmv file and a Navigation.class file are stored within the xxx-yyy folder. This info.bdmv file is the same as the info.bdmv file on the optical disk 11, and the Navigation.class file is an updated file of the Navigation.class file on the optical disk 11. In other words, the Navigation.class file of the local storage 24 is a file to write an upgraded version of the navigation program, as compared to that which is recorded on the optical disk 11.

Further, a PLAYLIST folder, a CLIPINF folder, and a STREAM folder are stored within the xxx-yyy folder.

In FIG. 5, a file which is set with the name "11111.mpls" and a file which is set with the name "22222.mpls" are stored in the PLAYLIST folder of the local storage 24, and of these the file which is set with the name "22222.mpls" serves as an updated file of the file with the same name on the optical disk 11. For example, the file which is set with the name "22222.mpls" of the local storage 24 indicates the downloaded Update PlayList, and the data attached to the PlayList by the SubPlayItem is written into this file.

A file which is set with the name "04000.clpi" is stored in the CLIPINF folder on the local storage 24, along with a file which is set with the name "01000.clpi" and a file which is set with the name "02000.clpi" which are also recorded on the optical disk 11. In other words, the file which is set with the name "04000.clpi" is a newly obtained file by downloading.

A file which is set with the name "04000.m2ts" is stored in the STREAM folder of the local storage 24. This file is a newly obtained file by downloading.

Note that similarly, in the example in FIG. 5, a folder which is set with the name "xxx-aaa" and a folder which is set with the name "yyy-bbb" are stored under "root" on the local storage 24. These are created at the time the optical disk identified by Studio_id "xxx" and Content_id "aaa" and the optical disk identified by Studio_id "yyy" and Content_id "bbb" are mounted on the playback device 1, and files are stored which correspond to each content.

When there is such a file system of the optical disk 11 and file system of the local storage 24, the file system merging processing unit 36 of the controller 21 merges the file system of the optical disk 11 and the file system of the local storage 24 on the memory 23, and creates a first virtual file system.

Specifically, when files with the same name are in both the optical disk 11 and the local storage 24, the file system merging processing unit 36 performs merging based on the time stamp (create date and time) written into each file, or version thereof, so that the file obtained by the download serves as the file to be referenced at time of content playback. Also, the file system merging processing unit 36 performs merging so that the file which is not on the optical disk 11 but is in the local storage 24 serves as the file to be referenced at time of content playback.

Figure 6:
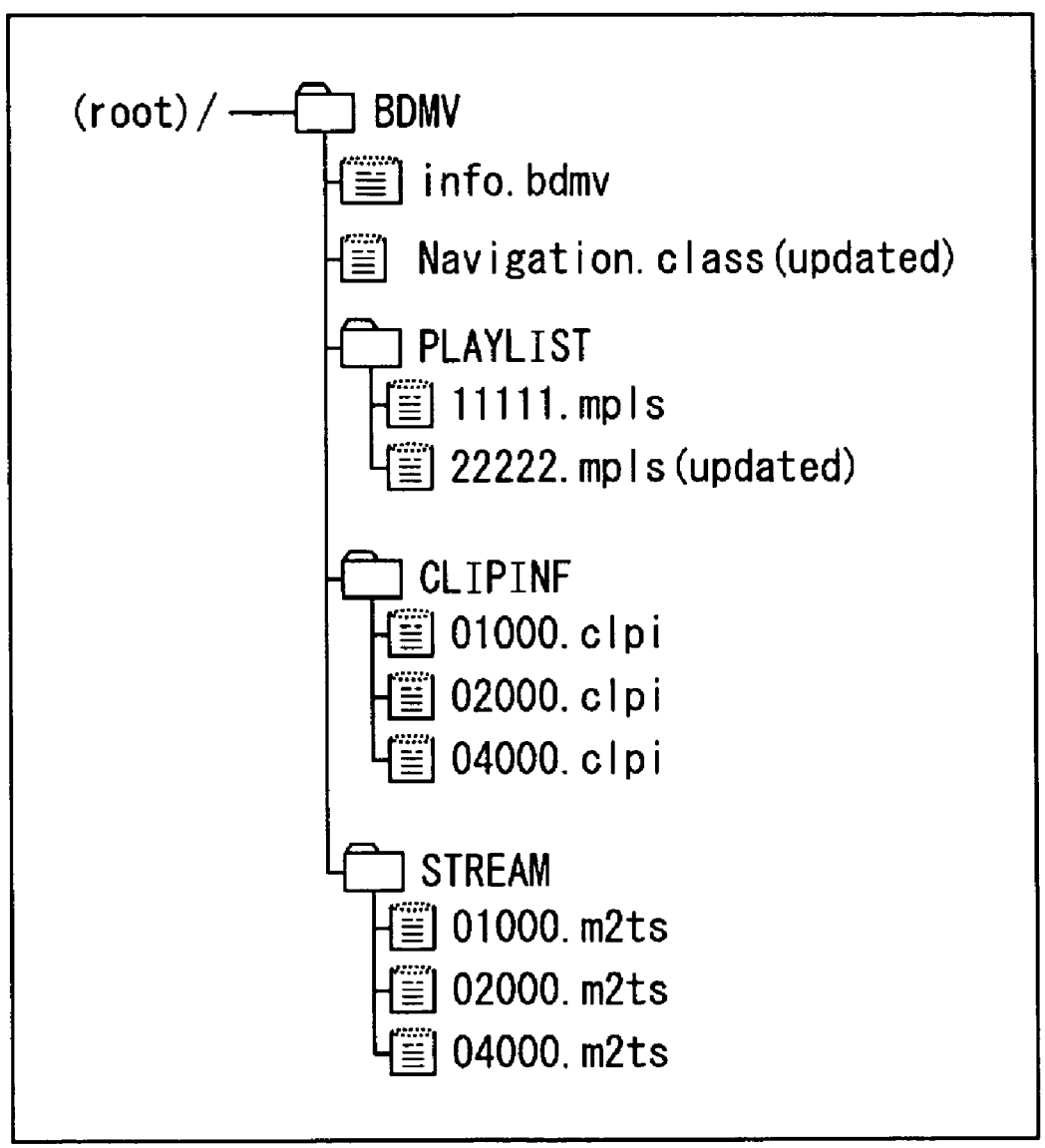
FIG. 6 is a diagram illustrating an example of a file system obtained by the two file systems in FIG. 5 being merged.

FIG. 6 is a diagram showing an example of a first virtual file system obtained by the two file systems in FIG. 5.

In FIG. 6, of the files recorded on the optical disk 11, the Navigation.class file and the file which is set with the name "22222.mpls" are updated (replaced) by the downloaded file. Also, the file which is set with the name "04000.clpi" and the file with is set with the name "04000.m2ts" which are not recorded onto the optical disk 11 are added.

In other words, when an updated navigation program or PlayList is in the downloaded file, the file with the same name on the optical disk 11 is updated (replaced) by that file. Also, when a Clip file not on the optical disk 11 (the Clip Information file and the AV stream file) is downloaded, this file is added to the file system.

Through the first virtual file system thus created, access to the AV stream based on the navigation program is performed (access is not performed directly to the optical disk 11 or the local storage 24).

Figure 7:
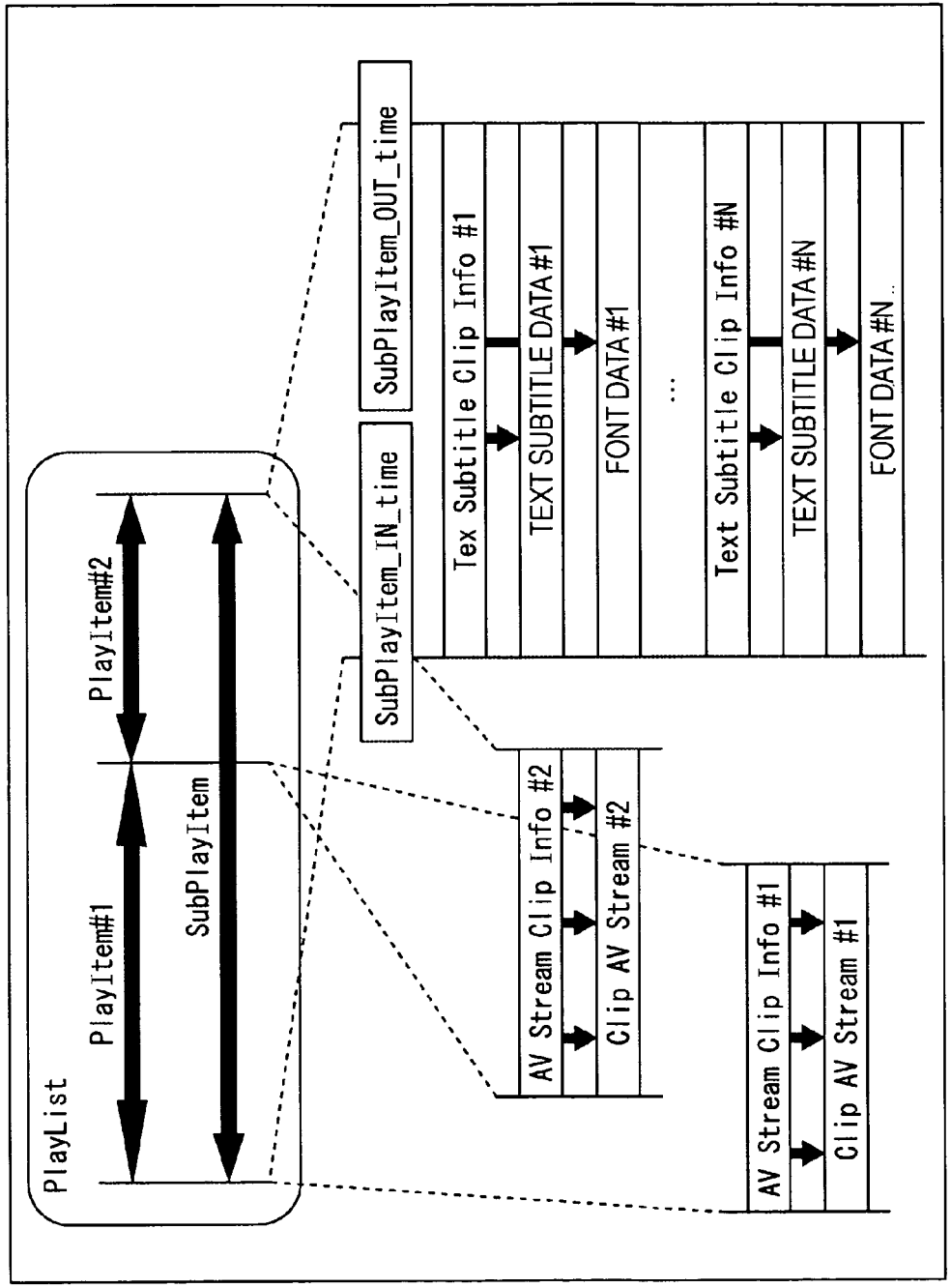
FIG. 7 is a diagram describing a playlist and data which can be referenced by a playlist.

Therefore, the data recorded in advance on the optical disk 11 and the data newly downloaded or copied and recorded on the local storage 24 are processed without being distinguished from one another, with the processing of the newly downloaded or copied new navigation program. As shown in FIG. 7, when the subtitle-related information for displaying the subtitles corresponding to a predetermined segment of AV stream is configured with text subtitle data configuring the text subtitle file corresponding to multiple language subtitles and a font file, the subtitle data in the language desired by the user, out of the multiple language subtitles which can be displayed by the subtitle-related information stored in the optical disk 11, and the subtitle-related information newly downloaded or copied and recorded onto the local storage 24, based on user operational input, is correlated to the AV stream recorded in advance on the optical disk 11, is processed, and displayed.

On the other hand, the selling side of the optical disk (merchant, creator) can sell the optical disk 11 whereupon a movie is recorded in a state of being capable of displaying English subtitles only, with subtitle information for Arabic being provided via the network 2 afterwards, for example. In other words, the selling side of the optical disk can sell the disk sooner without translating the disk into multiple languages at one time, and can provide additional subtitle-related information corresponding to other languages as needed. Also, the optical disk can be sold first in regions corresponding to common languages, and after translating processing has been completed for other languages, the sales regions for the optical disk can be added, and at the same time a downloading service for the text subtitle files for the corresponding languages can be started, and so forth.

In order to have subtitle data capable of displaying corresponding to the AV stream recorded in advance on the optical disk 11, the selling side of the optical disk (merchant, creator) needs to distribute at least a new updated playlist file and a text subtitle file, and additionally can distribute a font file for defining the display format of the subtitles corresponding to the text data written in the text subtitle file.

FIG. 8 shows an archive of such data to be additionally distributed (corresponding to the data stored on the local storage 24).

The data to be additionally distributed includes a playlist file (PlayList_file), 8-bit number information showing the number of the text subtitle file (number_of_TextSubTitle), and a text subtitle file (text_subtitle_file) corresponding to the above-described text subtitle file, and further, in some cases a font file (font_file) may be included.

FIG. 9 is a diagram showing a syntax of a SubPlayItem.

The 8-bit field of an Ref_to_STC_id specifies an identifier of an STC sequence referenced by the Clip. A SubPlayItem_IN_time specifies the playback start time of the SubPlayItem. A SubPlayItem_OUT_time specifies the playback end time of the SubPlayItem. In other words, the playback segment of the SubPlayItem can be specified with the SubPlayItem_IN_time and the SubPlayItem_OUT_time. Note that time information written in the SubPlayItem_IN_time and the SubPlayItem_OUT_time is expressed based on a 45 kHz clock used with the STC.

The 8-bit field of a number_of_ClipTextSubtitle specifies the total count of subtitle text to be defined in the SubPlayItem. The 8-bit field of a language_id specifies an identifier for the language to be used for the subtitles. The data in the language_id field follows ISO/IEC 639-1 regulations. The 8-bit field of a character_code_id specifies an identifier for a coding method for character data. The 8-bit field of the font_format_id specifies an identifier of a font format.

The 16-bit field of a font_file_path_length specifies the number of bytes for a font file path name written in the font_file_path. 0 can be specified in this field as the number of bytes for the font_file_path. If 0 is specified, processing is performed as if the internal font stored in advance in the playback device 1 has been specified. The font_file_path specifies the path name of the font file to be used for drawing the subtitle data. If an empty character string is specified in the font_file_path field, processing is performed as if the internal font stored in advance in the playback device 1 has been specified. The field values of the font_file_path are to be encoded by ISO/IEC 646.

The 16-bit field of a subtitle_file_path_length specifies the number of bytes of the path name for the text subtitle file written in the subtitle_file_path. The subtitle_file_path specifies the path name of the text subtitle file. The field values of the subtitle_file_path are to be encoded by ISO/IEC 646.

The 16-bit field of a comment_length specifies the number of bytes of information written in the comment. Comments relating to the text subtitles are written into Comment. Note that the comments written in Comment are to be written using a character collection ISO/IEC 646.

Figure 10:
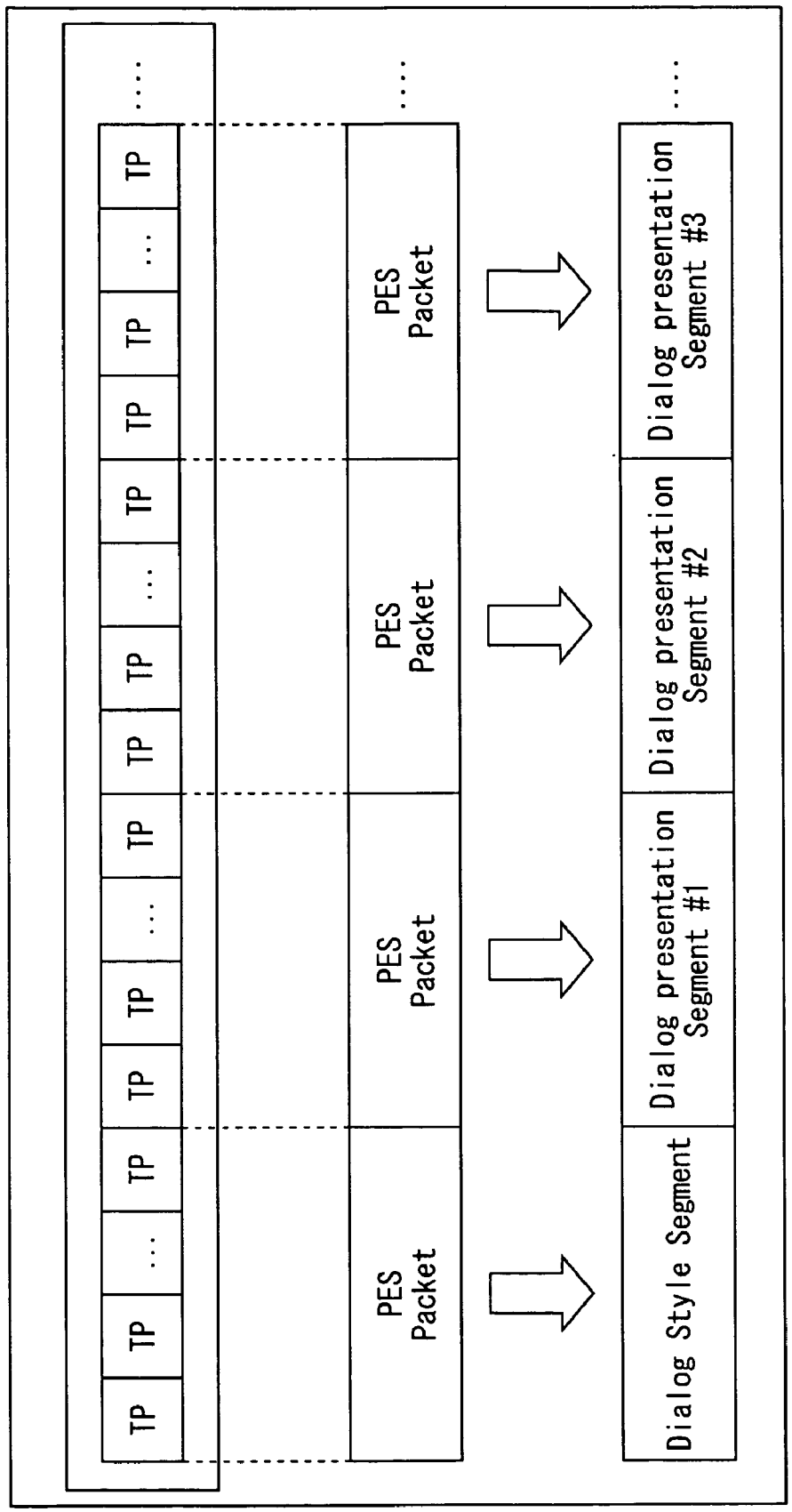
FIG. 10 is a diagram illustrating a configuration example of a text subtitle file.

With the present embodiment, a text subtitle file (the text_subtitle_file in FIG. 8 is a text subtitle file) is configured as a streaming file as shown in FIG. 10. Hereafter, a text subtitle file thus configured as a streaming file will be called a text subtitle stream file (Text_Subtitle Stream file).

As shown in the topmost diagram in FIG. 10, the text subtitle stream file takes the form of a transport stream configured of multiple transport packets (a packet described as a TP in FIG. 10, thus hereafter, this will be called TP along with the writing thereof) at the time of transmission.

Note that in the example in FIG. 10, the transport stream is configured only with TP having the same PID which is called 0x1800. In other words, in the example in FIG. 10, the transport stream is configured only with TP corresponding to a portion of the text subtitle stream file. That is to say, in the example of FIG. 10, the transport stream is configured only with text subtitle stream files.

Such a transport stream is converted to a stream with a PES (Packetized Elementary Stream) packet as a unit, at the time of or prior to data processing (for example at the time of recording processing or at the time of playback processing), as shown in diagram second from the top in FIG. 10. That is to say, the diagram second from the top in FIG. 10 shows a configuration example of a text subtitle stream file which uses a PES Packet as the unit thereof. The PES Packet at the front of the line of the multiple PES packets configuring the text subtitle stream file is called a Dialog Style Segment. This Dialog Style Segment is a PES packet corresponding to attribute data to be described later. Also, each of the multiple PES packets to follow the Dialog Style Segment are each called a Dialog Presentation Segment. These Dialog Presentation Segments are PES packets corresponding to character objects to be described later.

FIG. 11 is a diagram showing a syntax for such a text subtitle stream (Text_subtitle_stream) file.

In FIG. 11, the 16-bit field of number_of_dialog_presentation_segments specifies the number of Dialog Presentation Segments which follow the Dialog Style Segments. That is to say, the text subtitle stream (Text_subtitle_stream) file is configured with the Dialog Style Segment disposed in front thereof, and the number of Dialog Presentation Segments specified by the number_of_dialog_presentation_segments are disposed thereafter.

FIG. 12 is a diagram showing a general syntax for one Segment.

As is shown is FIG. 12, one Segment is configured with a segment_descriptor and a segment_data.

FIG. 13 is a diagram showing the syntax for the segment_descriptor.

The 8-bit field of segment_type specifies the type of segment. Specifically, one of the predetermined segment types shown in FIG. 14 is specified with a value (the value in the same row in FIG. 14) corresponding to the segment_type. That is to say, when the segment type is Dialog Style Segment, then 0x81 is set for segment_type. Also, when the segment type is Dialog Presentation Segment, 8×82 is set for segment_type. Note that 0x00 through 0x13, 0x19 through 0x7F, and 0x83 through 0xFF are prepared as reserves. Also, 0x14 through 0x18 and 0x80 are prepared as valued to specify segments for graphic streams.

The 16-bit field of segment_length specifies the number bytes of this segment.

Of the segments having such as syntax as shown in FIG. 12 through FIG. 14, the Dialog Style Segment syntax is as shown in FIG. 15.

That is to say, the segment_data in FIG. 12 becomes a dialog_style_set with the Dialog Style Segment in FIG. 15.

FIG. 16 and FIG. 17 show the syntax of this dialog_style_set. Details will be described later, but with this syntax, one of the features of the present invention, namely, "to add an outline to a character object used for text to configure subtitles and the like", can be realized.

In FIG. 16, the 1-bit field of player_style_flag specifies whether or not permission is granted to change the dialog_style_set to the individual style of the user. That is to say, as shown in FIG. 18, when permission is not granted (is prohibited), 0b is specified as the player_style_flag. Conversely, when permission is granted, 1b is specified as the player_style_flag.

The 8-bit field of number_of_region_styles specifies the number of region_styles (to be described later) used with this dialog_style_set. The 8-bit field of number_of_user_styles specifies the number of user_styles (to be described later) used with this dialog_style_set.

The 8-bit field of region_style_id specifies an identifier for an object region_style. The region shows the rendering region.

The 16-bit field of region_horizontal_position specifies the horizontal direction coordinates of the object region. The 16-bit field of the region_vertical_position specifies the vertical coordinates of the object region.

The 16-bit field of region_width specifies the width of the object region. The 16-bit field of region_height specifies the height of the object region. The 8-bit field of region_bg_palette_entry_id_ref specifies the background color of the object region.

The 16-bit field of text_box_horizontal_position specifies the horizontal direction coordinates of a text box (an area wherein text is displayed to configure the subtitles) within the object region. The 16-bit field of text_box_vertical_position specifies the vertical direction coordinates of a text box. The 16-bit field of text_box_width specifies the width of the text box. The 16-bit field of text_box_height specifies the height of the text box.

The 8-bit field of text_flow specifies the display direction of text displayed in a text box within an object region. Specifically, one of the display directions shown in FIG. 19 is specified with a value (the value in the same row in FIG. 19) corresponding to the text_flow. That is to say, when the display direction is in a horizontal direction facing from left to right, 1 is specified as the text_flow. When the display direction is in a horizontal direction facing from right to left, 2 is specified as the text_flow. When the display direction is in a vertical direction facing from top to bottom, 3 is specified as the text_flow. Note that as reserve values, values other than 0 and 1 through 3 are prepared.

The 8-bit field of text_horizontal_alignment specifies the text to be displayed in the text box of the object region as right-justified, left-justified, or centered (centered in the horizontal direction). Specifically, a value such as that shown in FIG. 20 is specified for the text_horizontal_alignment. That is to say, in the case of being left-justified, 1 is specified as the text_horizontal_alignment. In the case of being centered, 2 is specified as the text_horizontal_alignment. In the case of being right-justified, 3 is specified as the text_horizontal_alignment. Note that as reserve values, values other than 0 and 1 through 3 are prepared.

The 8-bit field of text_vertical_alignment specifies the text to be displayed in the text box of the object region as top-justified, bottom-justified, or centered (centered in the vertical direction). Specifically, a value such as that shown in FIG. 21 is specified for the text_vertical_alignment. That is to say, in the case of being top-justified, 1 is specified as the text_vertical_alignment. In the case of being centered, 2 is specified as the text_vertical_alignment. In the case of being bottom-justified, 3 is specified as the text_vertical_alignment. Note that as reserve values, values other than 0 and 1 through 3 are prepared.

The 8-bit field of line-space specifies spacing of a base line in the object region.

The 8-bit field of font_id_ref specifies the font of the text to be displayed in the text box of the object region.

The 8-bit field of font_style specifies the font style of the text to be displayed in the text box of the object region. Specifically, a value such as that shown in FIG. 22 is specified for font_style. That is to say, when the font style is Normal (a font style set in advance as the standard), 0x00 is specified for font_style. When the font style is Bold (bold type), 0x01 is specified for font_style. When the font style is Italic (italic type), 0x02 is specified for font_style. When the font style is Bold and Italic (bold and italic type), 0x03 is specified for font_style. When the font style is Outline-bordered (outlined type), 0x04 is specified for font_style. When the font style is Bold and Outline-bordered (bold and outlined type), 0x05 is specified for font_style. When the font style is Italic and Outline-bordered (italic and outlined type), 0x06 is specified for font_style. When the font style is Bold, Italic and Outline-bordered (bold, italic, and outlined type), 0x07 is specified for font_style.

The font styles specified by 0x04 through 0x07 of the above-described font styles are necessary font styles for realizing one of the features of the present invention, namely, "to add an outline (border) to a character object used as text to configure subtitles and the like". That is to say, in order to realize a feature of the present invention "to add an outline (border) to a character object used as text to configure subtitles and the like", the value for font_style needs to be specified as one of 0x04 through 0x07.

Hereafter, the font styles specified as 0x00 through 0x03 for font_style will be collectively called normal font style. Also, the font styles specified as 0x04 through 0x07 for font_style will be collectively called outlined styles.

The 8-bit field of font-size specifies the size of the text font to be displayed in the text box in the object region. The field of font_palette_entry_id_ref specifies the color of the this font.

With the syntax of dialog_style_set in the example in FIG. 16 and FIG. 17, when one of 0x04 through 0x07 is specified as font_style, that is to say, when an outline style is specified in order to realize one of the features of the present invention, namely, "to add an outline (border) to a character object used as text to configure subtitles and the like", an 8-bit field called ouline_palette_entry_id_ref and an 8-bit field called outline_size are specified.

The outline_palette_entry_id_ref specifies the color for the outline (the border of the text) when the text is to be displayed with a font style having an outline. The outline_size specifies the size (width) of the outline. Note that the color or size of the outline will be described later with reference to FIG. 28 through FIG. 30.

Note that with inline_style, in order to change the font_style partially to an outline style, it is necessary to use a table adding on the grayed items in FIG. 23 as to a Table 9-59 (Data_type definition) of a conventional Blu-Ray Disc (registered trademark) Read-Only Format Version 0.89r3, that is to say, to use a table wherein Data_Length is changed to 3 in the items (rows) wherein Data_type is 0x033, and also outline_palette_entry_id_ref and outline_size are newly added to inline_style_values( ) or text_string.

The syntax of the change settings (hereafter, user_changeable_Style_set) of user_style as to the syntax of the region_style described above within the dialog_style_set in the example in FIG. 16 and FIG. 17 is shown in FIG. 17.

The 8-bit field of user_style_id in FIG. 17 specifies an identifier for User_control_style of the object.

The 1-bit field of region_horizontal_position_direction specifies the movement direction of the region_horizontal_position. Specifically, when the movement direction is in the right direction, 0 is specified to the region_horizontal_position_direction and when the movement direction is in the left direction, 1 is specified thereto. The 15-bit field of region_horizontal_position_delta specifies the movement amount in a horizontal direction of the region_horizontal_position.

The 1-bit field of region_vertical_position_direction specifies the advancing (movement) direction of the region_vertical_position. Specifically, when the movement direction is in the lower direction, 0 is specified to the region_vertical_position_direction and when the movement direction is in the upper direction, 1 is specified thereto. The 15-bit field of region_vertical_position_delta specifies the movement amount in a vertical direction of the region_vertical_position.

The 1-bit field of font_size_inc_dec specifies the direction of change of the font size, that is to say, specifies whether the font will be larger or smaller after changing. Specifically, when the size is to be larger, 0b is specified to the font_size_inc_dec, and when the size is to be smaller, 1b is specified thereto. The 7-bit field of font_size_delta specifies the amount of change of the font size.

The 1-bit field of text_box_horizontal_position_direction specifies the movement direction in a horizontal direction of the text box. Specifically, when the movement direction is in the right direction, 0 is specified to the text_box_horizontal_position_direction and when the movement direction is in the left direction, 1 is specified thereto. The 15-bit field of text_box_horizontal_position_delta specifies the movement amount in a horizontal direction of the text box.

The 1-bit field of text_box_vertical_position_direction specifies the movement direction in a vertical direction of the text box. Specifically, when the movement direction is in the lower direction, 0 is specified to the text_box_vertical_position_direction and when the movement direction is in the upper direction, 1 is specified thereto. The 15-bit field of text_box_vertical_position_delta specifies the movement amount in a horizontal direction of the text box.

The 1-bit field of text_box_width_inc_dec specifies the direction of change of the text box width, that is to say, specifies whether the text box width will be wider or narrower after changing. Specifically, when the width is to be wider, 0b is specified to the text_box_width_inc_dec, and when the size is to be narrower, 1b is specified thereto. The 15-bit field of text_box_width_delta specifies the amount of change of the text box width.

The 1-bit field of text_box_height_inc_dec specifies the direction of change of the text box height, that is to say, specifies whether the text box height will be taller or shorter after changing. Specifically, when the height is to be taller, 0b is specified to the text_box_height_inc_dec, and when the height is to be shorter, 1b is specified thereto. The 15-bit field of text_box_height_delta specifies the amount of change of the text box height.

The 1-bit field of line_space_inc_dec specifies the direction of change of the line_space, that is to say, specifies whether the line_space will increase or decrease after changing. Specifically, when the line_space is to increase, 0b is specified to the line_space_inc_dec, and when the line_space is to decrease, 1b is specified thereto. The 7-bit field of line_space_delta specifies the amount of change of the line_space.

A palette( ) is not shown in the diagram but has the following fields. That is to say, the palette( ) is configured from fields called length, which specifies the length of the palette ( ), palette_entry_id, which specifies an identifier for a specific color in the palette, Y_value, which specifies the value of Y within (Y, Cb, Cr), Cb_value, which specifies the value of Cb within (Y, Cb, Cr), Cr_value, which specifies the value of Cr within (Y, Cb, Cr), and T_value, which specifies degree of transparency.

Figure 24:
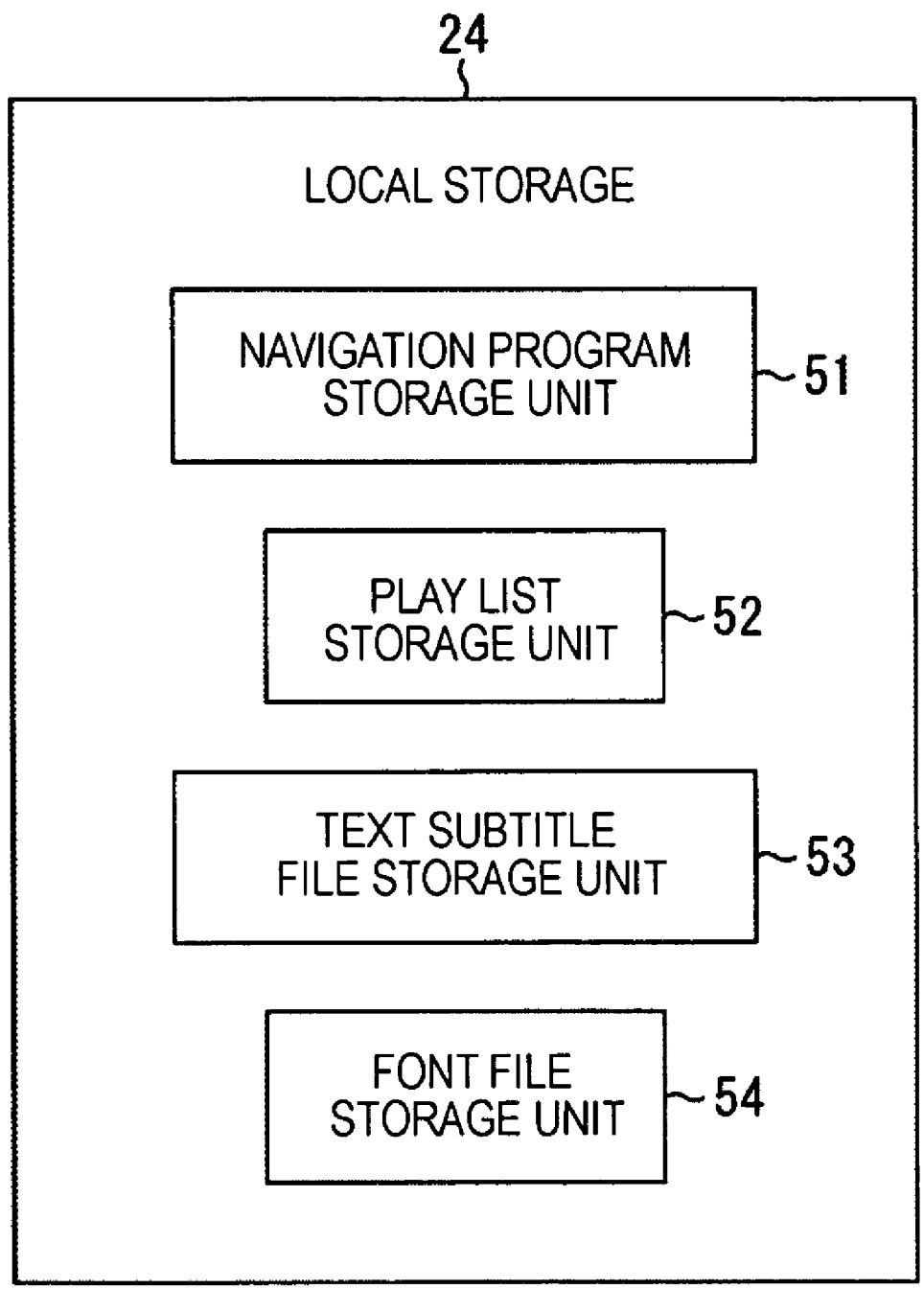
FIG. 24 is a diagram illustrating a virtual storage region of the local storage in FIG. 1.

Next, FIG. 24 is a diagram showing a virtual recording region of the local storage 24.

As described using FIG. 4, various types of information which has been downloaded or copied is recorded onto the local storage 24 in a file format described using FIG. 5. In order to record these files, the local storage 24 can be configured with a virtual storing region so as to include a navigation program storing unit 51 which is a region wherein a downloaded navigation program is stored, a play list recording unit 52 which is a region wherein a downloaded play list is stored, a text subtitle file storing unit 53 which is a region wherein a downloaded text subtitle file is stored, and a font file storing unit 54 which is a region wherein a downloaded font file is stored. The data files stored in the navigation program storing unit 51 and play list storing unit 52 are read out based on the control by the local storage directory managing unit 34 described using FIG. 4 and supplied to the memory 23, and the data files stored in the text subtitle file storage unit 53 and font file storage unit 54 are read out based on the control by the local storage directory managing unit 34 described using FIG. 4 and supplied to the decoder 26.

The storing regions in each of the navigation program storing unit 51, play list storing unit 52, text subtitle file storing unit 53, and font file storing unit 54 of the local storage 24 shown in FIG. 24 are virtual, and so the storing region of the local storage 24 does not need to be physically divided by stored information type as shown in FIG. 24.

Figure 25:
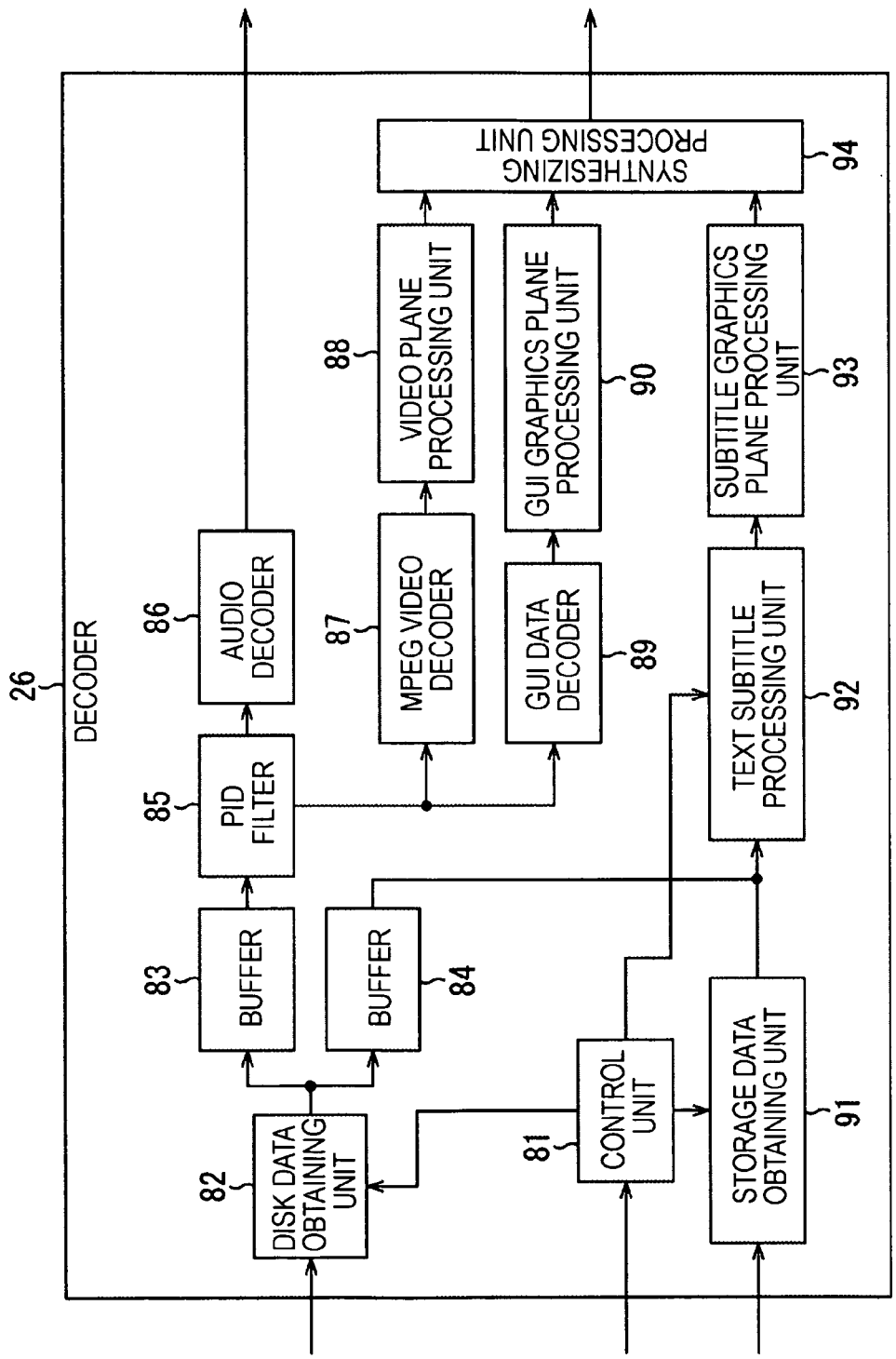
FIG. 25 is a block diagram for describing the detailed configuration of the decoder in FIG. 1.

Based on the control of the controller 21, the data read out from the optical disk 11 or local storage 24 is demodulated by an unshown demodulator and an ECC decoder, error correction is performed, and the data is supplied to the decoder 26. FIG. 25 is a block diagram for describing the detailed configuration of the decoder 26.

A control unit 81, a disk data acquiring unit 82, buffers 83 and 84, a PID (packet ID) filter 85, an audio decoder 86, a MPEG (Moving Picture Experts Group) a video decoder 87, a video plane processing unit 88, a GUI (Graphic User Interface) data decoder 89, a GUI graphics plane processing unit 90, a storage data acquiring unit 91, a text subtitle processing unit 92, a subtitle graphics plane processing unit 93, and a synthesizing processing unit 94 are provided on the decoder 26.

The control unit 81 controls processing in the various parts of the decoder 26, based on the control of the playback control unit 37. The disk data acquiring unit 82 obtains the data supplied to the decoder 26 of the data read out from the optical disk 11, supplies a multiplexed stream such as an AV stream specified by a PlayItem described with FIG. 7 to the buffer 83 which is a lead buffer for data specified by the PlayItem configuring the main path, and supplies the text subtitle file or font file data specified (font file data is sometimes not specified) by a SubPlayItem to the buffer 84 which is a lead buffer for data specified by the SubPlayItem configuring the sub path.

The stream data read from the buffer 83 is output to the PID filter 55 in a later step, with a predetermined timing. This PID filter 85 allocates and outputs the input multiplexed stream to the audio decoder 86, MPEG video decoder 87, or GUI data decoder 89 which are decoders for each elementary streams in later steps, according to the PID. That is to say, the PID filter 55 supplies the audio stream to the audio decoder 86, supplies the video stream to the MPEG video decoder 87, and supplies the image data relating to the user interface to the GUI data decoder 89.

The audio decoder 86 decodes the audio stream, and outputs the decoded audio stream data. The MPEG video decoder 87 decodes the video stream, and outputs the decoded video data to the video plane processing unit 88. The video plane processing unit 88 generates a video plane corresponding to an image (images making up a picture which is a moving image) displayed on one page (or one frame), based on the decoded video data, and outputs this to the synthesizing processing unit 94.

The GUI data decoder 89 decodes the interactive graphics stream, and supplies the decoded GUI data to the GUI graphics plane processing unit 90. The GUI graphics plane processing unit 90 generates a graphics plane corresponding to the GUI displayed on one screen, and outputs this to the synthesizing processing unit 94.

The storage data acquiring unit 91 obtains the data supplied to the decoder 26 (that is to say, text subtitle file or font file data) of the data read out from the local storage 24, and supplies this to the text subtitle processing 92. The text subtitle processing unit 92 decodes the text data supplied from the storage data acquiring unit or read out from the buffer 84, according to the control of the control unit 81, converts (rasterizes) this to raster data (character object data) such as a bitmap, based on predetermined font style data, and supplies this to the subtitle graphics plane processing unit 93. Details of the text subtitle processing unit 92 will be described later using FIG. 26. The subtitle graphics plane processing unit 93 generates a subtitle graphics plane corresponding to subtitles to be displayed on one page (or one frame), based on the decoded and rendered text data, and outputs this to the synthesizing processing unit 94.

The synthesizing processing unit 94 synthesizes a video plane supplied from the video plane processing unit 88, a graphics plane corresponding to the GUI supplied from the GUI graphics plane processing unit 90, and a subtitle graphics plane supplied from the subtitle graphics plane processing unit 93, and outputs this as a video signal.

Figure 26:
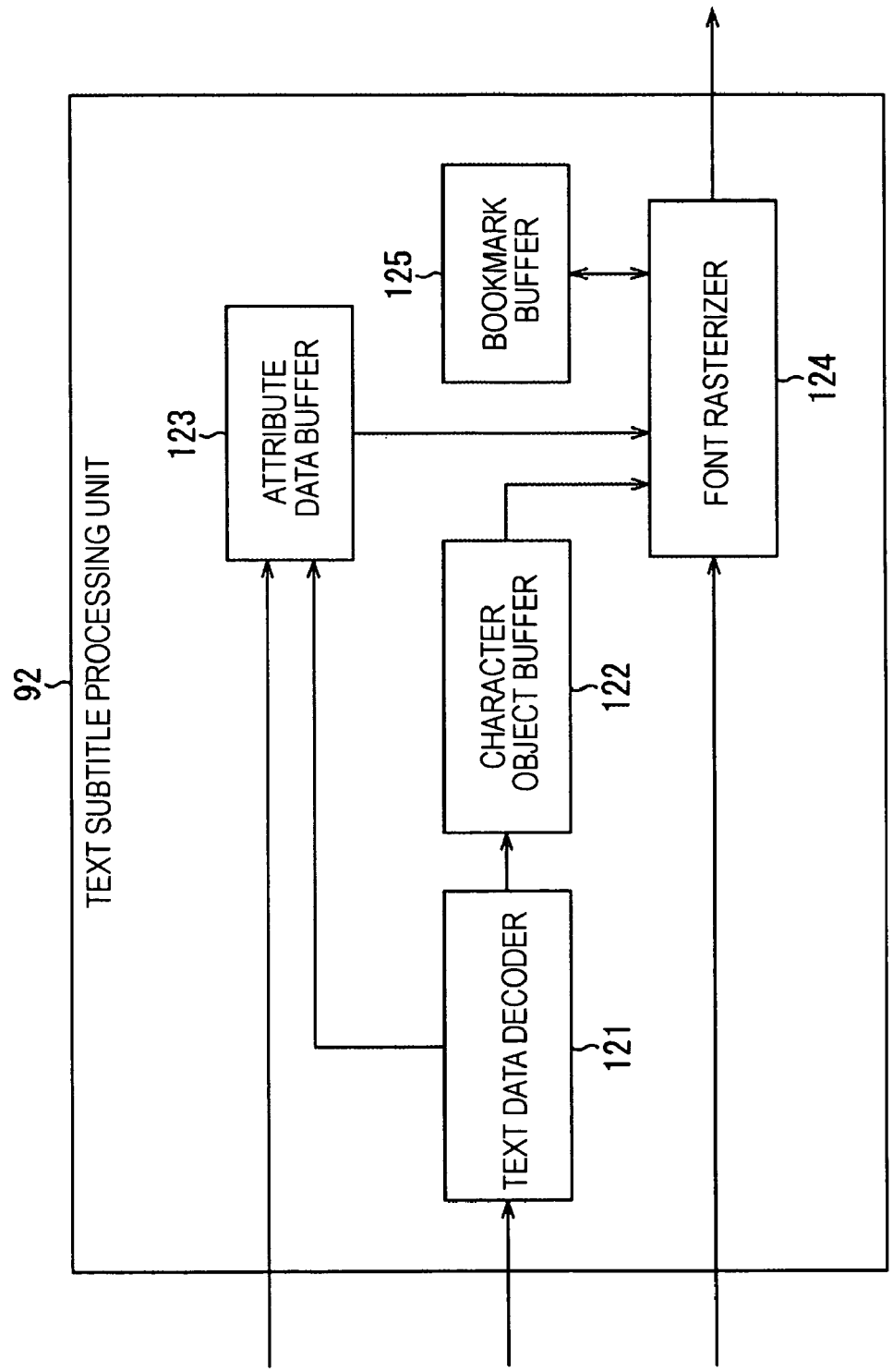
FIG. 26 is a block diagram for describing the detailed configuration of the text subtitle processing unit in FIG. 25.

FIG. 26 is a block diagram for describing the detailed configuration of the text subtitle processing unit 92.

The text data decoder 121 decodes the data of the text subtitle file, supplies the character objects to the character object buffer 122, and supplies the attribute data to the attribute data buffer 123.

The text subtitle file mentioned here indicates a text subtitle stream file described above and shown in FIG. 10, for example. Accordingly, a character object indicates the above-described Dialog presentation Segment and so forth in FIG. 10, for example. Also, the attribute data mentioned here indicates the above-described Dialog Style Segment and so forth in FIG. 10, specifically for example, the font_style specifying an outline style or a normal font style, the outline_palette_entry_id_ref specifying the outline color of a font style with an outline, and the outline_size specifying the size (width) of the outline of a font style having an outline, and so forth are indicated.

The attribute data stored in the attribute data buffer 123 is changed according to the control of the control unit 91, based on the operation input of the user. For example, if a user commands a change to the font size or character color, the corresponding User_control_style( ) (FIG. 17) out of the attribute data stored in the attribute data buffer 123 is changed with the control of the control unit 81.

The font rasterizer 124 converts the character object read out from the character object buffer 122 into raster data (character object data) such as a bitmap and outputs this to the subtitle graphics plane processing unit 93, based on the attribute specification read out from the attribute data buffer 123 and the font style data supplied from the buffer 84 or the storage data acquiring unit 91. Further, based on the attributes read out from the attribute data buffer 123, the font rasterizer 124 detects a character object to which a bookmark is attached, and using a bookmark buffer 125, does not perform duplicate rasterizing for the character object to which the same bookmark ID is attached. The details of the font rasterizer 124 will be described later with reference to FIG. 27.

The bookmark buffer 125 holds the raster data for the character object to which the bookmark is attached by the processing of the font rasterizer 124, and also the held raster data is read out by the font rasterizer 124.

Figure 27:
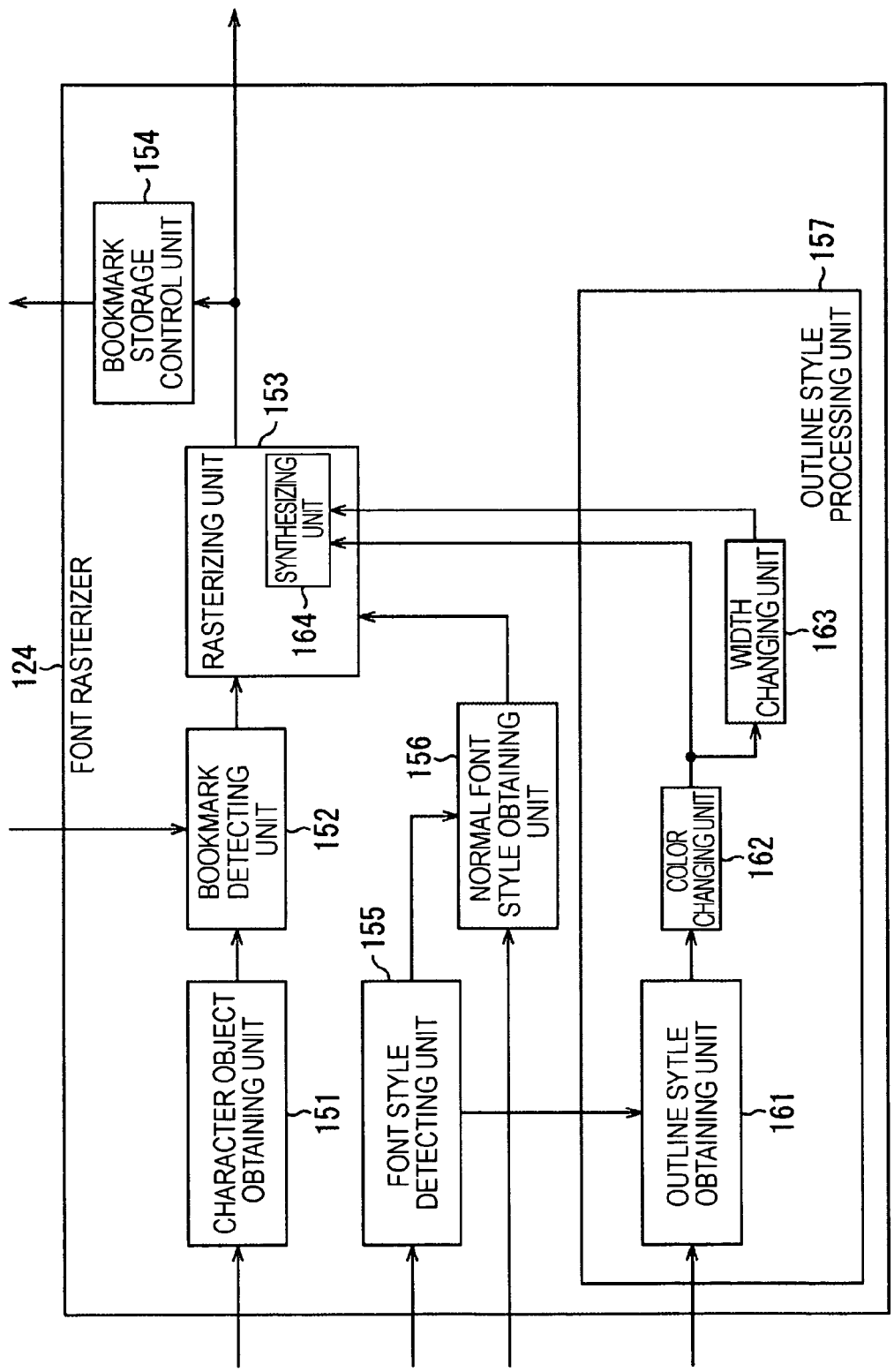
FIG. 27 is a block diagram for describing the detailed configuration of the font rasterizer in FIG. 26.

FIG. 27 is a block diagram for describing the detailed configuration of the font rasterizer 124.

The character object obtaining unit 151 obtains the character object read out from the character object buffer 122 (FIG. 26), and supplies this to the bookmark detecting unit 152.

The bookmark detecting unit 152 detects whether or not the character object supplied from the character object obtaining unit 151 is already stored in the bookmark buffer (FIG. 26) with a bookmark attached, that is to say, detects whether or not the character objects with the same bookmark ID attached are already stored in the bookmark buffer 125.

Then, when the bookmark detecting unit 152 detects that character objects with the same bookmark ID attached are stored in the bookmark buffer 125, the character object to which the same bookmark ID is attached (already rasterized data) is obtained from the bookmark buffer 125, and is output to the subtitle graphics plane processing unit 93 (FIG. 25).

Conversely, when the bookmark detecting unit 152 detects that character object with the same bookmark ID has not yet been stored in the bookmark buffer 125, the character object supplied from the character object obtaining unit 151 is supplied to the rasterizing unit 153 without change.

Based on the attribute specification read out from the attribute data buffer 123 and the font style data of normal font style supplied from the normal font style obtaining unit 156 or the font style data of an outline style supplied from the outline style processing unit 157, the rasterizing unit 153 converts the character object supplied from the bookmark detecting unit 152 into raster data (character object data) such as a bitmap and outputs this to the subtitle graphics plane processing unit 93, as well as supplying this to the bookmark storing control unit 154.

The synthesizing unit 164 provided on the rasterizing unit 153 will be described later.

Also, details will be described later with reference to FIG. 28 through FIG. 31, but the font style data of the outline style supplied from the outline style processing unit 157 is font style data which has changed (processed) the color or size (width) of the outline as needed as to the original font style data.

The bookmark storing control unit 154 determines whether or not a new bookmark is notated, based on the character object attribute data supplied from the rasterizing unit 153, and if a new bookmark is notated, control is performed to store the raster data in the bookmark buffer 125, and if a bookmark is not notated, the control thereof is prohibited.

The font style detecting unit 155 references the font_style corresponding to the attribute data stored in the attribute data buffer 123, and detects the font style necessary for rasterizing the character object obtained from the character object obtaining unit 151. Then if the font style detecting unit 155 detects that the font style is a normal font style, the detection results are notified to the normal font style obtaining unit 156. Conversely, if the font style detecting unit 155 detects that the font style is an outline style, the detection results are notified to the outline style obtaining unit 161 of the outline style processing unit 157.

The normal font style obtaining unit 156 obtains font style data of the normal font style specified by the detection results of the font style detecting unit 155 out of the font style data supplied from the buffer 84 or storage data acquiring unit 91, and supplies this to the rasterizing unit 153.

The outline style processing unit 157 obtains the font style specified by the detection results of the font style detecting unit 155 out of the font style data supplied from the buffer 84 or storage data acquiring unit 91, that is to say, obtains font style data with an outline style. Further, the outline style processing unit 157 references the outline_palette_entry_ id_ref corresponding to the attribute data stored in the attribute data buffer 123, and updates the color of the outline. Also, the outline style processing unit 157 references the outline_size corresponding to the attribute data stored in the attribute data buffer 123, and updates the size (width) of the outline. Then the outline style processing unit 157 supplies the font style data wherein the outline color or size (width) has been updated to the rasterizing unit 153 (or more accurately, to the synthesizing unit 164 to be described later).

Here, an example of a method for changing the size (width) of the outline will be described with referent to FIG. 28 through FIG. 31, before describing a detailed configuration example of the outline style processing unit 157. It goes without saying that the changing method for the size (width) of the outline is not limited to the following example.

The letter A is shown in FIG. 28 as an example of a character object data in a normal font style. Note that hereafter, the character object data A in a normal font style will be called character object data 171.

Also, the letter A is shown in FIG. 29 as an example of a character object data in an outline font style. Note that hereafter, the character object data A in an outline font style will be called character object data 181.

The character object data 181 is generated based on outline data. The outline data is one of the font style data whereby the shape of the character is expressed with an outline (border). This outline data has been used with an outline font. That is to say, an outline font is one of a format of fonts used conventionally, and refers to a format which holds outline data and performs lettering. The outline font has a feature of being better able to increase or decrease in size as compared to a bitmap font (a format holding a bitmap).

Figure 30:
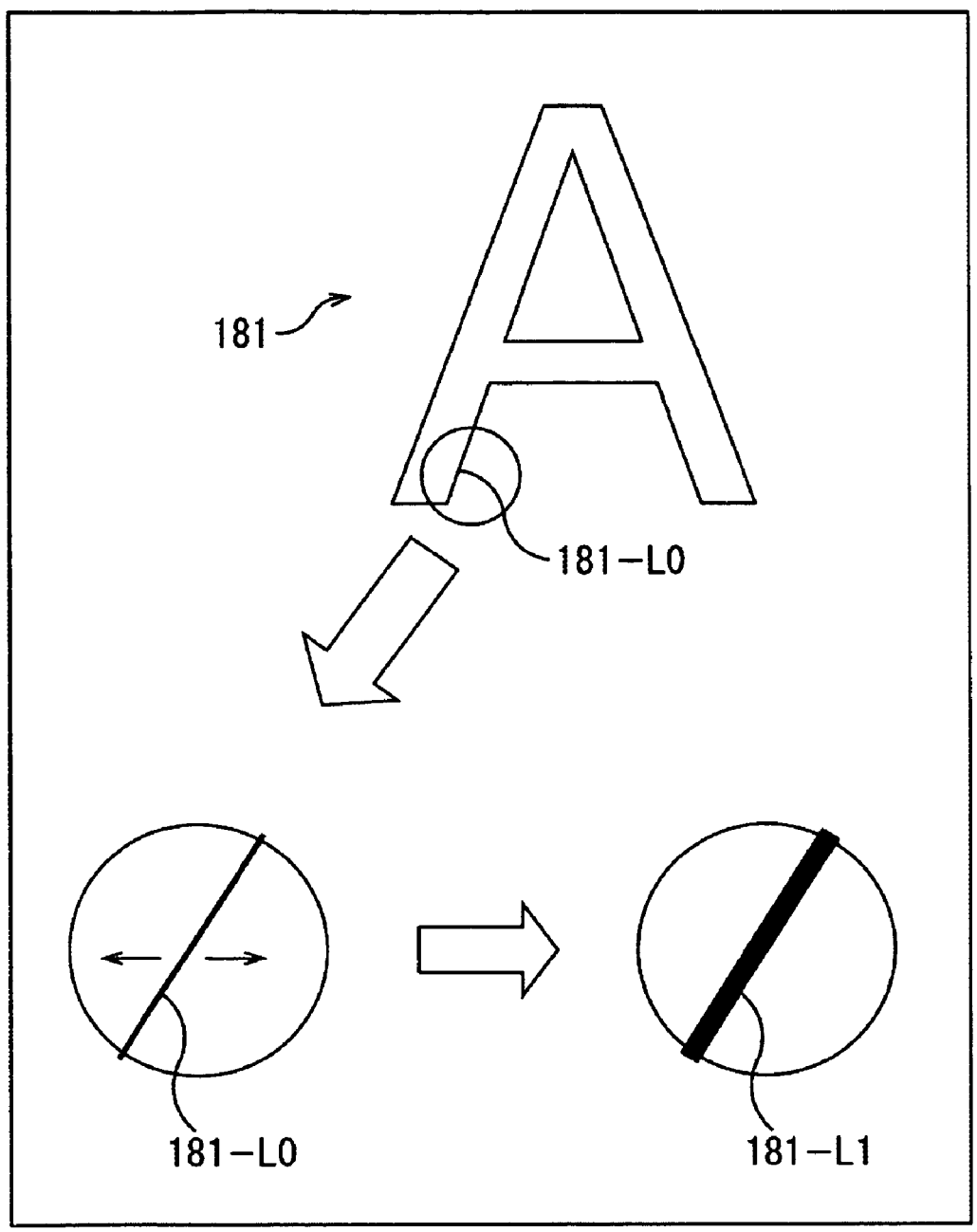
FIG. 30 is a diagram describing an example of a conventional method out of multiple changing methods for the size (width) of the outline.

FIG. 30 is a diagram to describe a conventional method of a changing method for changing the outline (border) width of the character object data 181.

As shown in FIG. 30, conventionally, an outline 181-L0 of the text object data 181 has the width thereof expanded or contracted at an equivalent rate for both directions in the vertical direction of the outline (with the example in FIG. 30, the left direction and right direction in the horizontal direction are also expanded), and as a result, is changed such as that shown in outline 181-L1.

Figure 31:
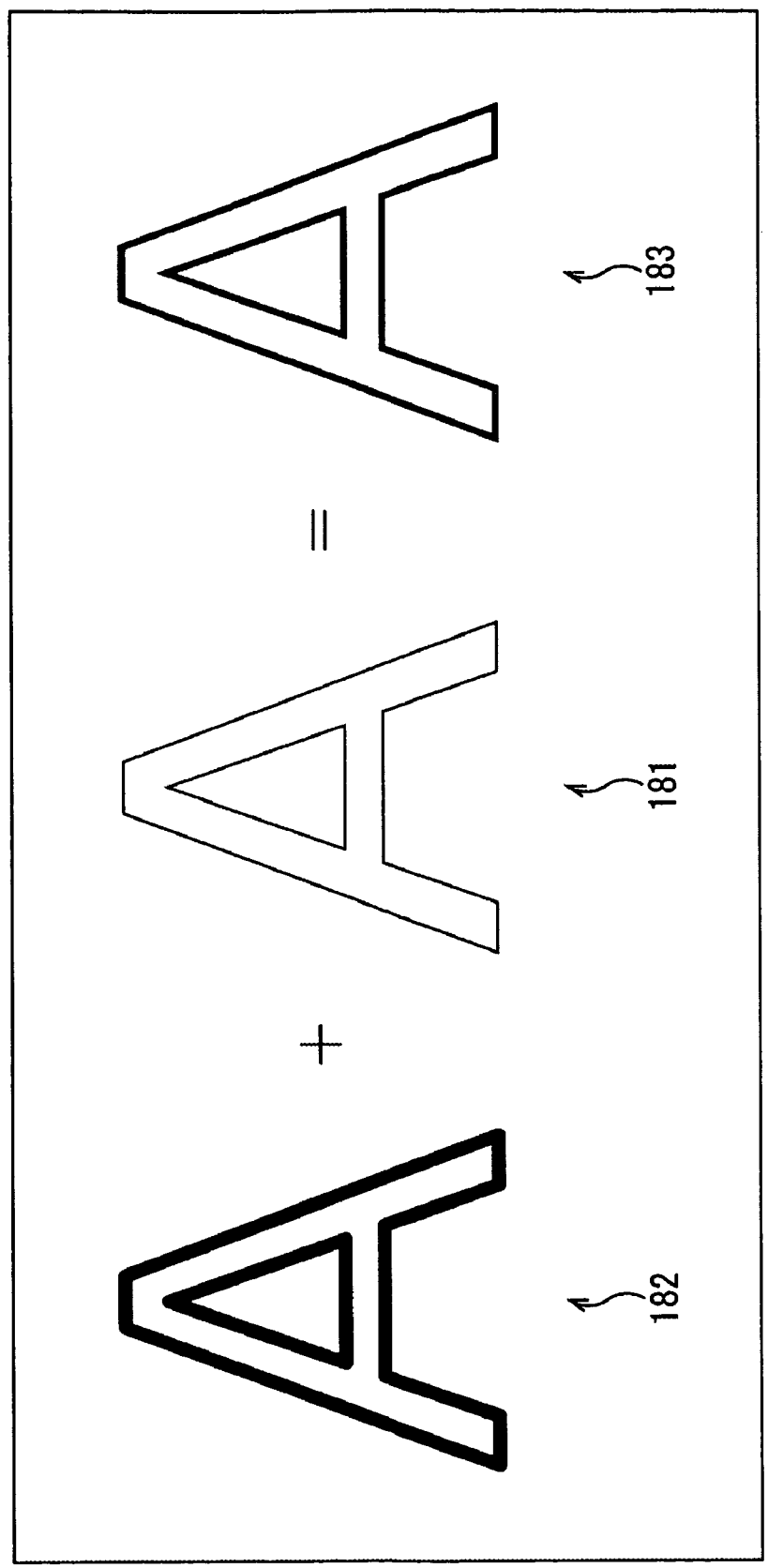
FIG. 31 is a diagram describing an example of a method applying the present invention out of multiple changing methods for the size (width) of the outline.

In other words, conventionally, the character object data 181 has the width of the outline made wider at an even rate for both vertical directions as to the outline, and as a result, is changed to a character object data 182 such as that shown in FIG. 31.

When comparing this character object data 182 with the original character object data 181, it can be easily seen that there is a problem with the conventional method, such that when the width of the outline is made wider at an equivalent rate in both directions in the vertical direction as to the outline, the area of the region of white color (the outlined portion) surrounded by an outline is decreased by the same amount, and in the worst case scenario the white region is erased (the outlined portion is covered up).

Thus, to solve the problem of this conventional method, with the present embodiment, the size (width) of the outline of the character object data 181 can be changed by using a method such as that shown in FIG. 31. That is to say, FIG. 31 is a diagram describing an example of a changing method which can resolve the problem of a conventional method of a changing method for the size (width) of the outline. In other words, with the present embodiment, the method in FIG. 31 is applied to the synthesizing unit 164 in the rasterizing unit 153 (FIG. 27).

Hereafter, the method in FIG. 31 will be further described. In other words, hereafter, the operation (processing) of the synthesizing unit 164 will be described.

First, the synthesizing unit 164 generates character object data 181 based on outline data. Next, the synthesizing unit 164 generates character object data 182 whereby the width of the outline of the character object data 181 has been changed at an equivalent rate for both directions in the vertical direction of the outline, according to a conventional method described in FIG. 30.

Note that the synthesizing unit 164 uses font style data with an outline supplied from the outline style processing unit 157 for the purpose of generating this character object data 182. However, the font style data with an outline will be described later.

Next, the synthesizing unit 164 layers the character object data 181 over the character object data 182 (executes synthesizing processing). As a result, if the outline of the character object data 181 is called a center line, the character object data 183 having an outline whereby only the direction opposite (hereafter will be called the outside direction) from the direction facing the outlined portion (hereafter will be called in inside direction) as to the center line has become thicker, that is to say, the character object data 183 is generated whereby only the width of the outline is made thicker on the outer side without changing the area of the outlined portion as to the character object data 181.

As described above, the synthesizing unit 164 uses the font style data of an outline style supplied by the outline style processing unit 157 for the purpose of generating the character object data 182. Also, the character object data 182 has an outline whereof the width (both the inside direction and the outside direction) or color has been changed as to the outline of the character object data 181 generated by the outline data (the font style data of the outline style used in a conventional outline font). Accordingly, the outline style processing unit 157 needs to change the outline data necessary for generating the character object data 181 into the font style data necessary for generating the character object 182. Therefore, with the present embodiment, the outline style processing unit 157 is configured as shown in FIG. 27. That is to say, with the example in FIG. 27, the outline style processing unit 157 is configured with an outline style obtaining unit 161, a color changing unit 162, and a width changing unit 163.

The outline style obtaining unit 161 obtains the font style specified with the detecting results of the font style detecting unit 155 out of the font style data supplied from the buffer 84 or the storage data acquiring unit 91, that is to say, obtains the font style data (outline data) of the outline style. The font style data of the obtained outline style is provided to the color changing unit 162.

The color changing unit 162 references the outline_palette_entry_id_ref corresponding to the attribute data stored in the attribute data buffer 123, and changes the color of the outline according to the font style data of the outline style supplied from the outline style obtaining unit 161. The font style data of the outline style whereof the outline color is changed is supplied to the width changing unit 163 and the synthesizing unit 164 of the rasterizing unit 153.

That is to say, in the example in FIG. 31 for example, based on the font style data supplied from the color changing unit 162, the synthesizing unit 164 generates the character font data 181 having an outline of a color corresponding to the font style data thereof.

The width changing unit 163 references the outline_size corresponding to the attribute data stored in the attribute data buffer 123, and expands or contracts the size (width) of the outline at an equivalent rate on the outside direction and the inside direction for the font style data of the outline style supplied from the color changing unit 162. The font style data of the outline style whereof the size (width) of the outline has been changed in the outside direction and the inside direction is supplied from the width changing unit 163 to the synthesizing unit 164.

Then the synthesizing unit 164 executes processing according to the conventional method in FIG. 30 as described above, based on the font style data supplied from the width changing unit 163. Specifically, for example, when the character object data 181 in FIG. 31 is already generated, the synthesizing unit 164 generates the character object data 182 having an outline with the width expanded or contracted at an equivalent rate in the outside direction and inside direction (and with the color being changed) as to the width of the outline of the character object 181, based on the font style data supplied from the width changing unit 163.

Then, as described above, the synthesizing unit 164 generates character object data 183 having an outline with the width expanded or contracted only for the outside direction (and with the color being changed) as to the width of the outline of the character object 181, by synthesizing the character object data 181 and the character object data 182.

Figure 32:
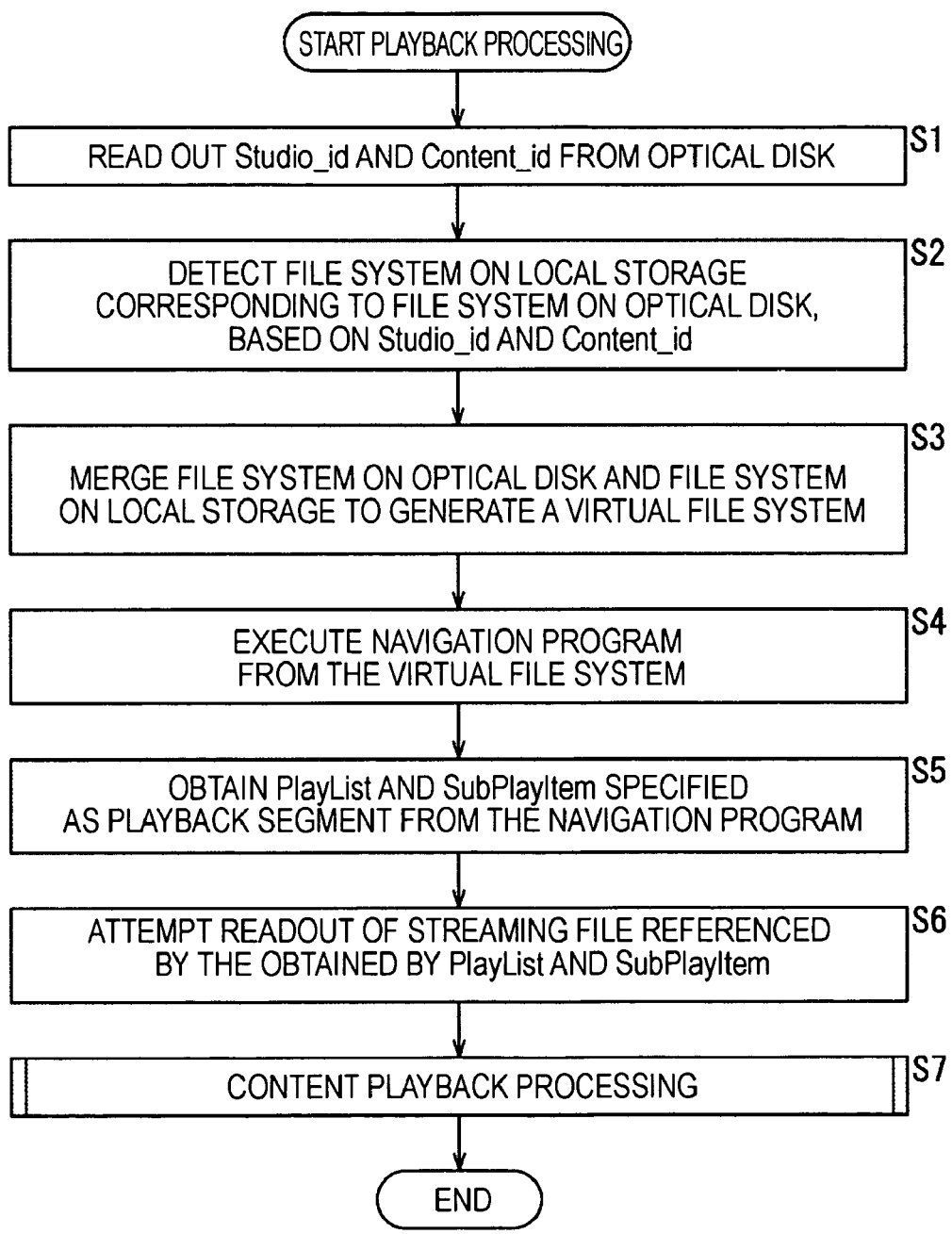
FIG. 32 is a flowchart for describing playback processing.

Next, the playback processing of the controller 21 (FIG. 1) will be described with reference to FIG. 32.

When playback of the content recorded on the optical disk 11 is specified in the state wherein the downloaded update file stored in the local storage 24 as described above, the optical disk directory managing unit 35 reads out the Studio_id and Content_id from the optical disk 11 in step S1, and outputs the read out Studio_id and Content_id to the local storage directory managing unit 34.

In step S2, the local storage directory managing unit 34 detects the file system of the local storage 24 corresponding to the file system of the optical disk 11, based on the Studio_id and Content_id supplied from the optical disk directory managing unit 35, and supplies this to the file system merging processing unit 36. As described above, the file system corresponding to the file system of the optical disk is stored in the directory of the local storage 24 wherein the name including Studio_id and Content_id are set (FIG. 5).

At this time, the file system of the optical disk 11 is output from the optical disk directory managing unit 35 to the file system merging processing unit 36.

In step S3, the file system merging processing unit 36 merges the file system of the optical disk 11 and the file system of the local storage 24 as described with reference to FIG. 5 and FIG. 6, and generates the first virtual file system. The generated first virtual file system is output to the playback control unit 37, and is used for playback of the AV stream file.

In step S4, the playback control unit 37 specifies the navigation program from the supplied first virtual file system and executes this. Accordingly, as shown in FIG. 6, when the updated navigation program is in the first virtual file system, this navigation program (the navigation program recorded on the local storage 24) is executed.

In step S5, the playback control unit 37 obtains the PlayList and SubPlayItem which the navigation program specifies as a playback segment, the flow advances to step S6, the local storage directory managing unit 34 and the optical disk directory managing unit 35 are controlled, and files referencing the obtained PlayList and SubPlayItem (AV file, text subtitle file, font file, and the like) are read out and supplied to the decoder 26. Here, the time stamp expressed by a PlayList or SubPlayItem is converted to an address by the Clip information, and access is performed to the AV stream or the like.

That is to say, when the local storage 24 has an AV stream file which the PlayList or SubPlayItem references, the playback control unit 37 reads out the AV stream file from the local storage 24, and if the local storage 24 does not have such a file, the AV stream file is read out from the optical disk 11.

For example, when the playback control unit 37 controls the local storage directory managing unit 34 and the optical disk directory managing unit 35 according to the file system in FIG. 6 and performs readout of the AV stream, the AV stream file which is set with the file name "01000.m2ts" or the AV stream file which is set with the file name "02000.m2ts", which are prepared in advance on the optical disk 11 is read out from the optical disk 11, and the AV stream file which is set with the file name "04000.m2ts" which is added by being downloaded is read out from the local storage 24.

Figure 33:
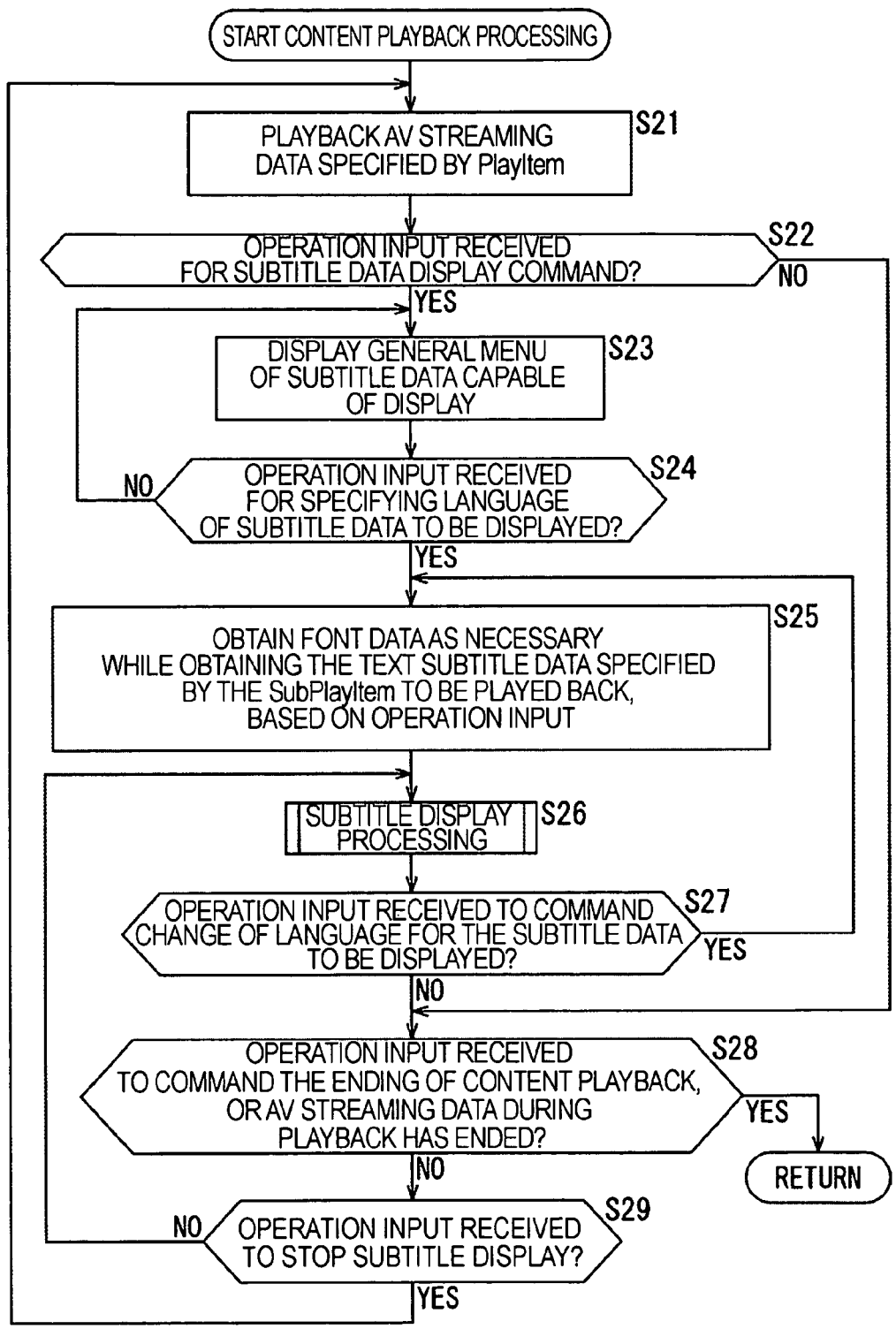
FIG. 33 is a flowchart for describing content playback processing.

In step S7, the content playback processing to be described later using FIG. 33 is executed, the read out AV stream file or text subtitle stream file and the like are decoded, moving images or audio or subtitles are output from the display device, and the processing is ended.

Thus, the first virtual file system is generated and used when playing back content, whereby for example the data in a text subtitle file which the SubPlayItem references is read out simultaneously with the AV stream and is played back.

Next, the content playback processing which is executed in step S7 in FIG. 32 will be described with reference to the flow chart in FIG. 33.

In step S21, the playback control unit 37 (FIG. 4) controls the decoder 26 to play back the AV stream data specified by the PlayItem.

In step S22, the operation input obtaining unit 32 determines whether or not an operational input commanding subtitle data display has been received. If it is determined in step S22 that an operational input commanding subtitle data display has not been received, the flow proceeds to step S28 to be described later.

If it is determined in step S22 that an operational input is received to command display of the subtitle data, the operation input obtaining unit 32 supplies a signal corresponding to the operational input of the user to the menu screen display control unit 31 in Step S23. The menu screen display control unit 31 displays a list menu of subtitle data which can be displayed on the display device.

In step S24, the operational input obtaining unit 32 determines whether or not operational input has been received to specify a language for the subtitle data to be displayed. If it is determined in step S24 that operational input has not been received to specify a language for the subtitle data to be displayed, the processing is returned to step S23, and the processing thereafter is repeated.

In step S24, if it is determined that operational input has been received to specify a language for the subtitle data to be displayed, the operation input obtaining unit 32 supplies a signal corresponding to the operational input of the user to the playback control unit 37 in Step S25. The playback control unit 37 controls the local storage directory managing unit 34 to read out the text subtitle data referenced by the SubPlayItem specified based on the operational input of the user, and to supply this to the storage data acquiring unit 91 of the decoder 26, as well as to read out the font style data corresponding to the font (outline font and the like) specified by the user, and supply this to the storage data acquiring unit 91 of the decoder 26 as necessary.

Figure 34:
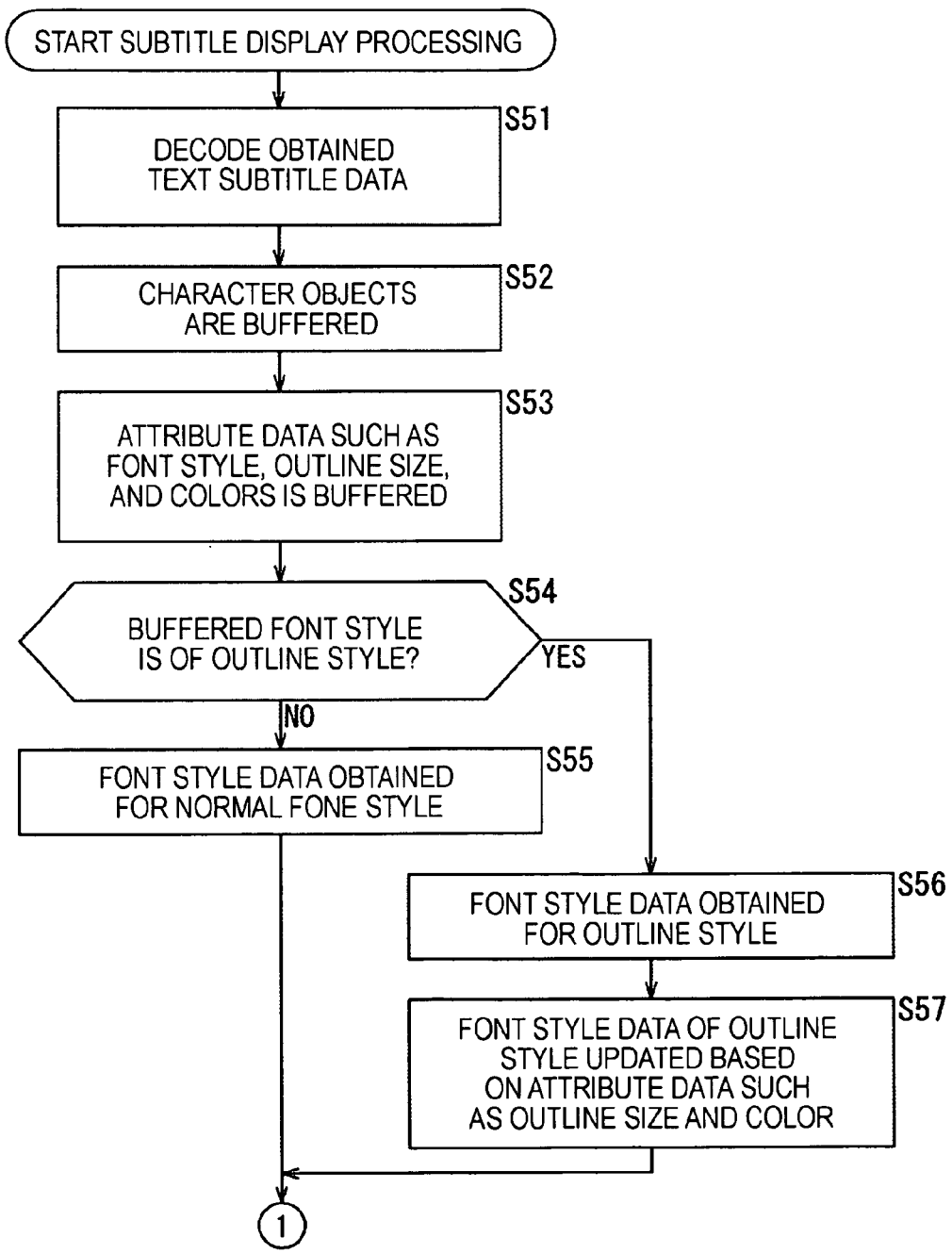
FIG. 34 is a flowchart for describing subtitle display processing.
Figure 35:
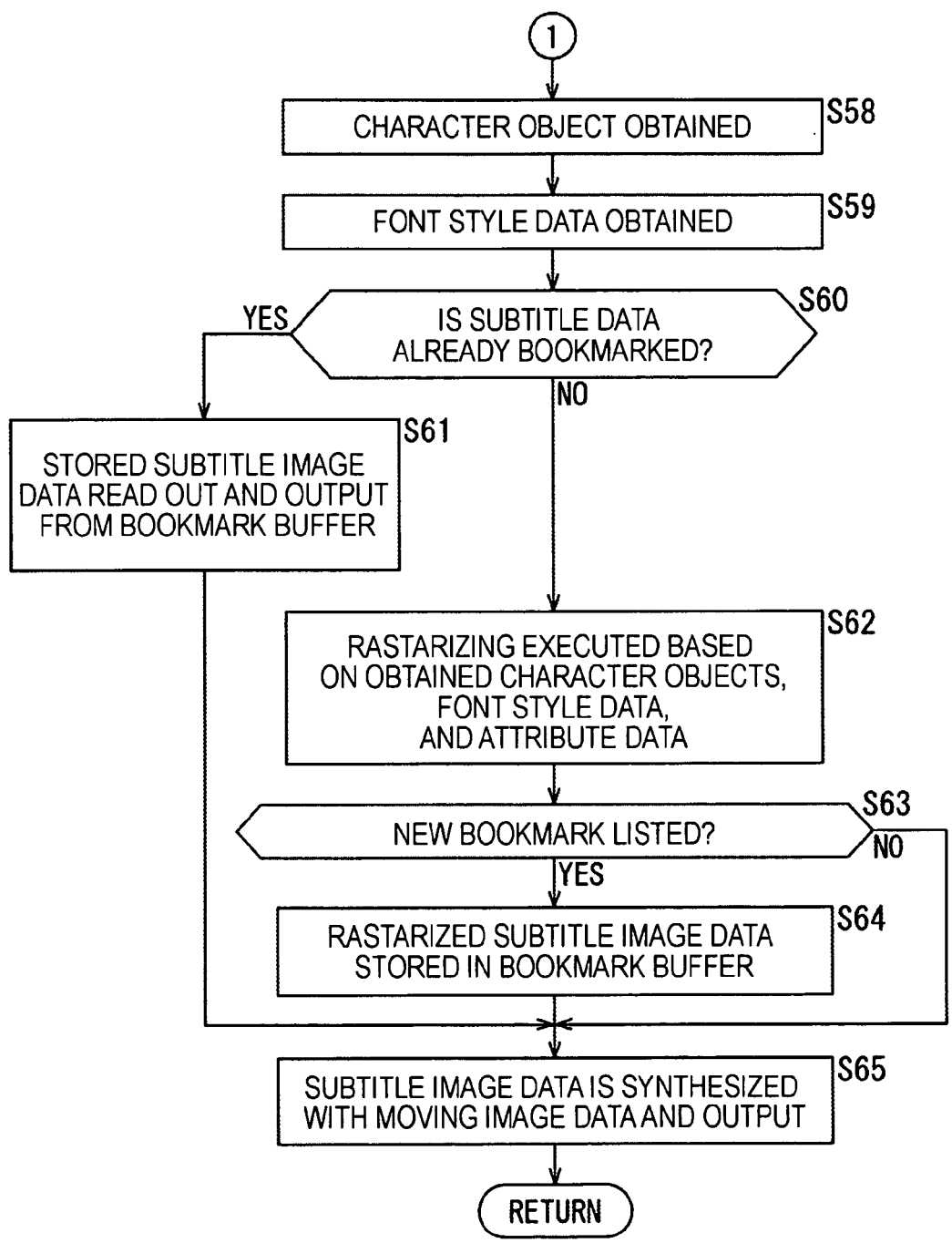
FIG. 35 is a flowchart for describing subtitle display processing.

In step S26, subtitle display processing which will be described later with reference to FIG. 34 and FIG. 35 is executed by the decoder 26.

In Step S27, the operational input obtaining unit 32 determines whether or not operational input has been received to command a change of language for the subtitle data to be displayed. If it is determined that operational input has been received to command a change of language for the subtitle data to be displayed, the processing is returned to step S25, and the processing thereafter is repeated.

If it is determined in step S22 that operational input has not been received to command the display of subtitle data, or if it is determined in step S27 that operational input has not been received to command a change of language for the subtitle data to be displayed, the operational input obtaining unit 32 determines in step S28 whether or not operational input has been received to command the end of content playback, or whether or not the AV stream data playing back has ended.

If it is determined in step S28 that operational input to command the end of content playback has not been received, and that the AV stream data has not ended playing back, the operational input obtaining unit 32 determines in step S29 whether or not operational input has been received to stop the display of subtitles.

If it is determined in step S29 that operational input has not been received to stop the display of subtitles, the processing is returned to step S26, and the processing thereafter is repeated. If it is determined in step S29 operational input has been received to stop the display of subtitles, the processing is returned to step S21, and the processing thereafter is repeated.

When it is determined in step S28 that operational input has been received to command the end of content playback or that the AV stream data playing back has ended, the processing is ended.

With such a process, the subtitles in the language desired by the user are displayed along with the video and audio of the content, using the text subtitle file recorded in advance on the optical disk 11 or downloaded from the server 3 and recorded onto the local storage 24, and the text subtitle file to be read out is changed so as to change the language of the subtitles to be displayed, based on the operational input by the user.

Next, the subtitle display process executed in step S26 of FIG. 33 will be described with reference to the flowcharts in FIG. 34 and FIG. 35.

In step S51, a text data decoder 121 (FIG. 26) of the text subtitle processing unit 92 of the decoder 26 (FIG. 25) decodes the text subtitle data obtained from the storage data acquiring unit 91.

In step S52, the text data decoder 121 supplies the character object included in the decoded text subtitle data to a character object buffer 122, and so the character object is buffered by the character object buffer 122.

In step S53, the text data decoder 121 supplies the attribute data such as font style (font_style), outline color (outline_palette_entry_id_ref), size (outline_size) and so forth which are included in the decoded text subtitle data to the attribute data buffer 123, and so the attribute data is buffered by the attribute data buffer 123.

In Step S54, the font style detecting unit 155 (FIG. 27) of the font rasterizer 124 determines whether or not the font style buffered in the processing in step S53 is an outline style.

If it is determined in step S54 that the font style is not an outline style, that is to say, if the font style is determined to be a normal font style, the normal font style obtaining unit 156 obtains the font style data of a normal font style in step S55.

Conversely, if it is determined in step S54 that the font style is an outline style, the outline style processing unit 157 obtains the font style data of the outline style in step S56. Then in step S57, the outline style processing unit 157 updates the font style data of the outlines style, based on the attribute data such as the size or color of the outline buffered in the processing in step S53. That is to say, the font style data of the outline style wherein the color or width of the outline has changed is generated.

When the font style data for a normal font style is obtained in the processing in step S55, or when the font style data of an outline style obtained in the processing in step S56 is updated in the processing in step S57, the flow proceeds to step S58 in FIG. 35.

In step S58, the character-object obtaining unit 151 obtains a character object from the character object buffer 122 (FIG. 26) and supplies this to the bookmark detecting unit 152.

In step S59, the rasterizing unit 153 obtains the font style data from the normal font style obtaining unit 156 or the outline style processing unit 157.

In Step S60, the bookmark detecting unit 152 references the attributes buffered in the processing in step S53 (FIG. 34) and the bookmark buffer 125, and determination is made as to whether or not the subtitle data to be rasterized (the subtitle data corresponding to the character object obtained in the processing in step S58) is bookmarked, and this is subtitle data which has already been buffered by the bookmark buffer 125.

If it is determined in step S60 that the above-described data is subtitle data which has been bookmarked and buffered, the bookmark detecting unit 152 reads out the subtitle image data (raster data) for the stored bookmark from the bookmark buffer 125 in step S61, and outputs this. Thus, the flow proceeds to step S65.

Conversely, if it is determined in step S60 that the above-described data is subtitle data which has not been bookmarked and buffered, the character object obtained in the processing in step S58 is supplied to the rasterizing unit 153 from the bookmark detecting unit 152. Thus, the flow proceeds to step S62.

In step S62, the rasterizing unit 153 executes rasterizing based on the character object obtained in the processing in step S58, the font style data obtained (and updated in the processing in step S57 as needed) in the processing in step S55 or S56 in FIG. 34, and the attribute data buffered in the processing of step 53 in FIG. 34, and outputs the raster data (character object data), which is the result of the execution thereof, to the subtitle graphics plane processing unit 93 (FIG. 25), and also supplies this to the bookmark storage control unit 154. The subtitle graphics plane processing unit 93 generates the subtitle graphics plane based on the supplied raster data, and supplies this to the synthesizing processing unit 94.

In step S63, the bookmark storage control unit 154 determines whether or not a new bookmark is written to the attribute data based on such attribute data of the subtitle data (character object data which is raster data) rasterized in the processing in step S62.

If it is determined in step S63 that a bookmark is written, the bookmark storage control unit 154 stores the rasterized subtitle image data (raster data) in the bookmark buffer 125 in step S64.

After the processing in step S62, if it is determined in step S63 that a bookmark is not written, or if the processing in step S61 is ended, the synthesizing processing unit 94 (FIG. 25) synthesizes the supplied subtitle image data with the moving image data in step S65, and outputs this. Thus, the subtitle display processing which is the processing in step S26 in FIG. 33 is ended, and the flow proceeds to step S27.

With such a processing, readout of the text subtitle file and font file data is controlled so that the subtitle data in the language desired by the user is displayed with the font desired by the user, with the attributes desired by the user, and the attribute data which is buffered as necessary is changed and rasterized.

Accordingly, in the event that the frame currently being played back is a frame wherein the colors of the subtitle and video color are the same or similar, that is to say, from the perspective of the user, in the event that the subtitle and video appear to be integrated and the subtitles cannot be differentiated, the user can display the text configuring the subtitles with a desired outline style by specifying a desired outline style, and so can differentiate the subtitles with certainty.

Next, a manufacturing method of the recording medium 11 where data is stored which can be played back on the playback device 1 will be described using a situation with the recording medium 11 being a disk-shaped recording medium as an example, with reference to FIG. 64 and FIG. 65.

Figure 36:
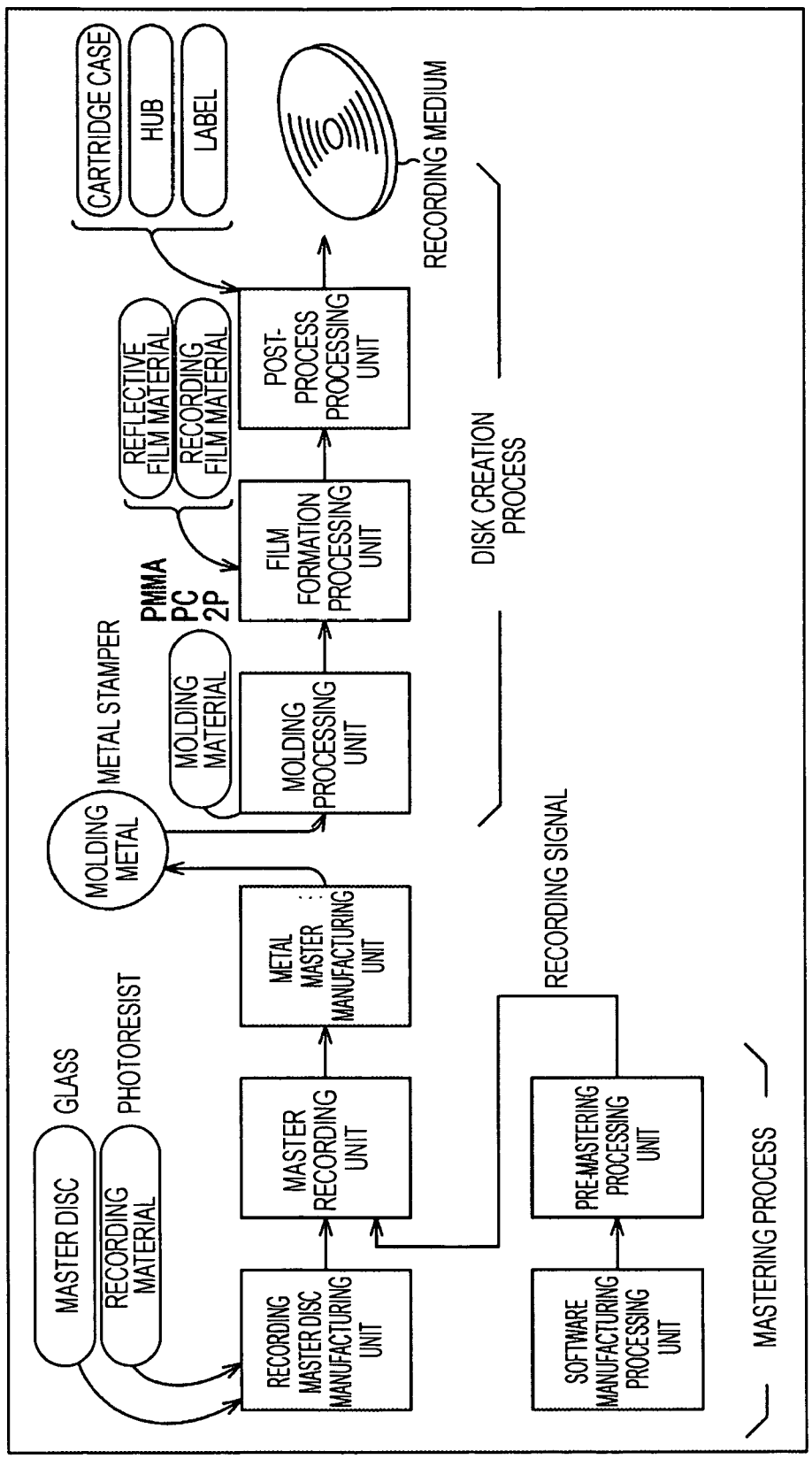
FIG. 36 is a diagram for describing the manufacturing of the recording medium whereupon data is recorded which can be played back with the playback device in FIG. 1.

That is, as shown in FIG. 36, a master formed of glass for example or the like is prepared, and a recording material such as a photoresist is coated thereupon. Thus, the recording master is manufactured.

Figure 37:
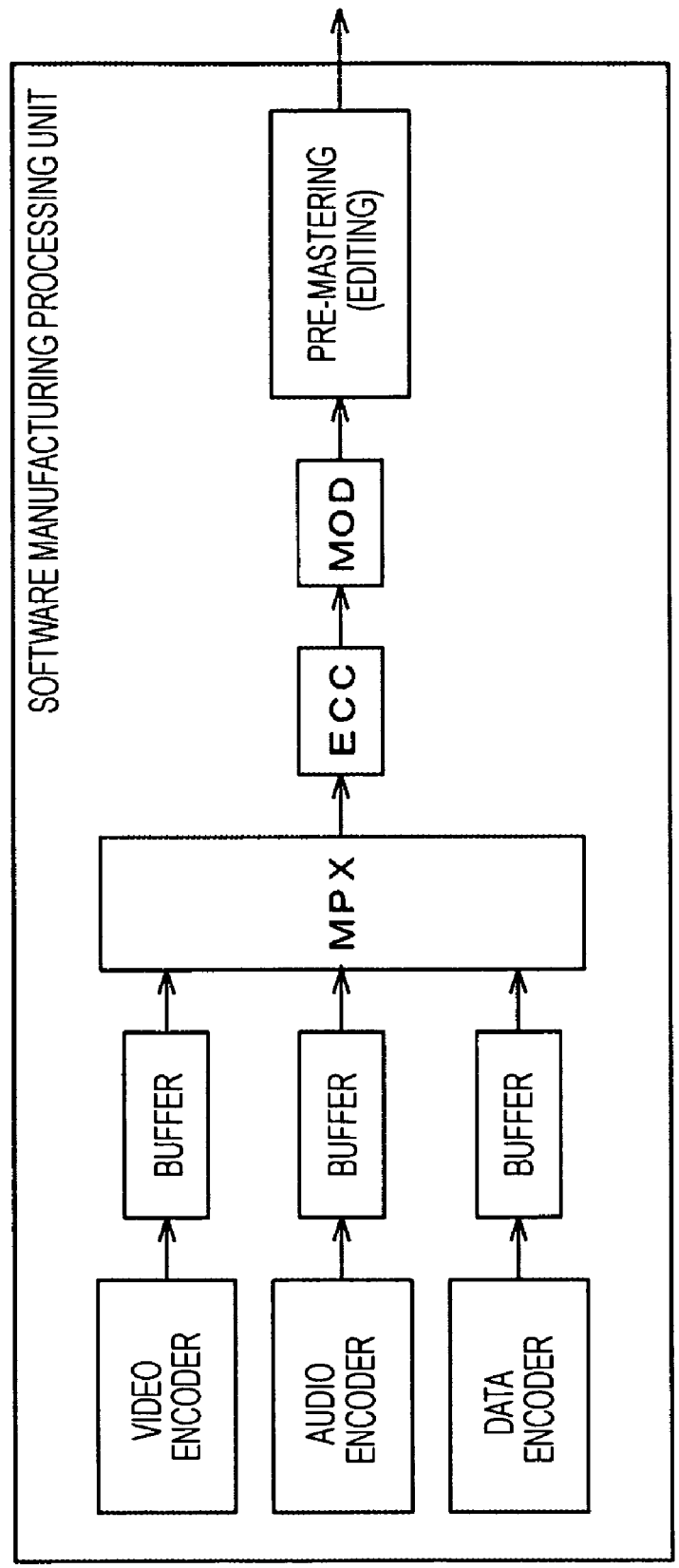
FIG. 37 is a diagram describing the manufacturing of the recording medium whereupon data is recorded which can be played back with the playback device in FIG. 1.

Then as shown in FIG. 37, the video data in a format capable of being played back on the playback device 1, which is encoded with the encoding device (video encoder) with the software manufacturing processing unit, is temporarily stored in the buffer, the audio data encoded with the audio encoder is temporarily stored in the buffer, and further, data other than streaming data (for example, Indexes, Playlist, PlayItem, and so forth) which is encoded with the data encoder is temporarily stored in the buffer. The video data, audio data, and data other than streaming data, which are each stored in the buffer, are multiplexed together with a synchronizing signal with a multiplexer (MPX), and an error-correcting code is attached with an error-correcting coding circuit (ECC). Then predetermined modulations are made with a modulating circuit (MOD), and according to a predetermined format, the data is temporarily stored on a magnetic tape, for example, and the software to be recorded on the recording medium 11 which is capable of being played back on the playback device 1 is manufactured.

The software is edited (pre-mastered) as needed, and a signal is generated for the format to be recorded on the optical disk. Then a laser beam is modulated to correspond to this recording signal and this laser beam is irradiated on the photoresist on the master. Thus, the photoresist on the master is exposed corresponding to the recording signal.

Then the master is developed, and pits are produced on the master disk. Processing such as electroforming and so forth, for example, is performed on the master thus prepared, and a metal master on which the pits on the glass master are transferred over is manufactured. A metal stamper is manufactured from the metal master, and this serves as a forming mold.

A material such as PMMA (acrylic) or PC (polycarbonate) is inserted by injection or so forth into the forming mold, and is fixed. Alternatively, after coating the 2P (ultraviolet hardening resin) or the like on the metal stamper, ultraviolet light can be irradiated thereupon and thus hardened. Thus, the pits on the metal stamper can be transferred onto a replica made of resin or the like.

A reflective film is formed on the replica thus generated by vapor deposition or sputtering or the like. Alternatively, a reflective film is formed on the generated replica by spin-coating.

Then, processing of the inner and outer diameter of the disk is performed, and necessary processing is performed, such as attaching two disks to one another. Further, a label is attached, a hub is attached, and the disk is inserted in a cartridge. Thus, the recording medium 11 on which data is recorded which is capable of being played back on the playback device 1 is completed.

Note that the above-described series of processing can also be executed with software. With such software, the program configuring the software is installed in a computer with built-in dedicated hardware or is installed from a program storage medium onto a general-use personal computer or the like which is capable of executing various functionality by installing various programs.

This program storage medium is not only configured with a removable medium 28 such as a magnetic disk (including a flexible disk), optical disk (including CD-ROM (Compact Disk-Read Only Memory) or DVD (Digital Versatile Disk)), optical magnetic disk (including MD (Mini-Disk) (registered trademark)), semiconductor memory, or the like on which the program is recorded and distributed to users separately from the computer as shown in FIG. 1, but also may be configured with memory 23 such as ROM or RAM in which the program is recorded, or a local storage 24 such as a hard disk, so as to be provided to users in a state of being assembled into the device proper.

Also, according to the present Specification, the steps describing the program recorded onto the program storage medium include not only the processing performed in the described consecutive order, but also includes processing that is executed concurrently or individually and not necessarily consecutively.

Note that in the present Specification, "system" indicates the entirety of devices configured of multiple devices.

The invention claimed is:

1. An information processing device for generating subtitle data to display subtitles corresponding to a predetermined AV stream, comprising:
    character object holding means for holding a character object in order to display said subtitles;
    attribute data holding means for holding attribute data which includes at least font style specifying information which can specify at least a font style with an outline as a font style to be applied for said character objects, and width specifying information which can specify the width of the outline of the character object corresponding to the font style having an outline in the case that said font style having an outline is specified in said font style specifying information;
    converting means for obtaining font style data of said font style having an outline in the case whereby said font style having an outline is specified in said font style specifying information held by said attribute data holding means, updating said font style data based on said width specifying information held by said attribute data holding means, and converting said character object held by said character object holding means into subtitle data, using at least said updated font style data;
    obtaining means for obtaining first font style data of said font style having an outline in the case that said font style having an outline is specified in said font style specifying information;
    width changing means for performing processing to expand or contract the width of the character object outline corresponding to said first font style data obtained with said obtaining means, based on said width specifying information, at an equivalent rate for the inner side direction facing the outline portion of the character object and the opposite outer side direction thereof, and outputting second font style data of a font style having an outline wherein the width thereof has been expanded or contracted in said inner side direction and said outer side direction; and synthesizing means for performing processing to synthesize the character object data corresponding to said first font style data obtained with said obtaining means onto the character object corresponding to said second font style data output from said width changing means, and outputting said subtitle data formed by character object data of a font style having an outline wherein the width thereof has been stretched in only said outer side direction, which is obtained as a result of the processing.

2. An information processing method of an information processing device for generating subtitle data to display subtitles corresponding to a predetermined AV stream, comprising:

a character object holding control step for controlling the holding of a character object in order to display said subtitles;

an attribute data holding control step for controlling the holding of attribute data which includes at least font style specifying information which can specify at least a font style having an outline as a font style to be applied for said character objects, and width specifying information which can specify the width of the outline of the character object corresponding to the font style having an outline in the case that said font style having an outline is specified in said font style specifying information;

a converting step for obtaining font style data of said font style having an outline in the case whereby said font style having an outline is specified in said font style specifying information held by the control processing of said attribute data holding control step, updating said font style data based on said width specifying information held by the processing of said attribute data holding controlling step, and converting said character object held by said character object holding means into subtitle data, using at least said updated font style data;

obtaining first font style data of said font style having an outline in the case that said font style having an outline is specified in said font style specifying information;

performing processing to expand or contract the width of the character object outline corresponding to said first font style data obtained with said obtaining, based on said width specifying information, at an equivalent rate for the inner side direction facing the outline portion of the character object and the opposite outer side direction thereof, and outputting second font style data of a font style having an outline wherein the width thereof has been expanded or contracted in said inner side direction and said outer side direction; and performing processing to synthesize the character object data corresponding to said first font style data obtained with said obtaining onto the character object corresponding to said second font style data output from said processing to expand or contract width, and outputting said subtitle data formed by character object data of a font style having an outline wherein the width thereof has been stretched in only said outer side direction, which is obtained as a result of the processing.

3. A non-transitory computer storage device having computer-readable instructions stored thereon that when executed by a computer cause the computer to implement a process for generating subtitle data to display subtitles corresponding to a predetermined AV stream, comprising:

a character object holding control step for controlling the holding of a character object in order to display said subtitles;

an attribute data holding control step for controlling the holding of attribute data which includes at least font style specifying information which can specify at least a font style having an outline as a font style to be applied for said character objects, and width specifying information which can specify the width of the outline of the character object corresponding to the font style having an outline in the case that said font style having an outline is specified in said font style specifying information;

a converting step for obtaining font style data of said font style having an outline in the case whereby said font style having an outline is specified in said font style specifying information held by the control processing of said attribute data holding control step, updating said font style data based on said width specifying information held by the processing of said attribute data holding controlling step, and converting said character object held by said character object holding means into subtitle data, using at least said updated font style data;

obtaining first font style data of said font style having an outline in the case that said font style having an outline is specified in said font style specifying information;

performing processing to expand or contract the width of the character object outline corresponding to said first font style data obtained with said obtaining, based on said width specifying information, at an equivalent rate for the inner side direction facing the outline portion of the character object and the opposite outer side direction thereof, and outputting second font style data of a font style having an outline wherein the width thereof has been expanded or contracted in said inner side direction and said outer side direction; and performing processing to synthesize the character object data corresponding to said first font style data obtained with said obtaining onto the character object corresponding to said second font style data output from said processing to expand or contract width, and outputting said subtitle data formed by character object data of a font style having an outline wherein the width thereof has been stretched in only said outer side direction, which is obtained as a result of the processing.

\* \* \* \* \*